(12) United States Patent
Fleming et al.

(10) Patent No.: US 7,774,291 B2
(45) Date of Patent: *Aug. 10, 2010

(54) NETWORK OF NETWORKS OF ASSOCIATIVE MEMORY NETWORKS FOR KNOWLEDGE MANAGEMENT

(75) Inventors: James S. Fleming, Apex, NC (US); Brian J. McGiverin, Richmond, VA (US); Manuel Aparicio, IV, Chapel Hill, NC (US)

(73) Assignee: Saffron Technology, Inc., Morrisville, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/329,239

(22) Filed: Dec. 5, 2008

(65) Prior Publication Data

US 2009/0119240 A1    May 7, 2009

Related U.S. Application Data

(62) Division of application No. 10/980,520, filed on Nov. 3, 2004, now Pat. No. 7,478,192.

(51) Int. Cl.
*G06F 12/00* (2006.01)
*G06N 5/02* (2006.01)
(52) U.S. Cl. .................. 706/46; 711/108; 711/E12.001
(58) Field of Classification Search .................. 706/46
See application file for complete search history.

(56) References Cited

U.S. PATENT DOCUMENTS

| | | | |
|---|---|---|---|
| 3,613,089 A | 10/1971 | Karp | |
| 4,660,166 A | 4/1987 | Hopfield | |
| 5,014,219 A | 5/1991 | White | |
| 5,058,184 A | 10/1991 | Fukushima | |
| 5,172,204 A | 12/1992 | Hartstein | |

(Continued)

OTHER PUBLICATIONS

Using neural network categorization method to develop an innovative knowledge management technology for patent document classification Trappey, A.J.C.; Lin, S.C.I.; Wang, A.C.L.; Computer Supported Cooperative Work in Design, 2005. Proceedings of the Ninth International Conference on vol. 2 Publication Year: 2005 , pp. 830-835.*

(Continued)

*Primary Examiner*—Michael Holmes
(74) *Attorney, Agent, or Firm*—Myers Bigel Sibley & Sajovec

(57) ABSTRACT

Associative memory systems, methods and/or computer program products include a network of networks of associative memory networks. A network of entity associative memory networks is provided, a respective entity associative memory of which includes associations among a respective observer entity and observed entities that are observed by the respective observer entity, based on input documents. A network of feedback associative memory networks includes associations among observed entities for a respective positive and/or negative evaluation for a respective task of a respective user. A network of document associative memory networks includes associations among observed entities in a respective observed input source, such as a respective input document. A network of community associative memory networks includes associations among a respective observer entity, observed entities that are observed by the respective observer entity, and observed tasks of users in which the observer entity was queried. Associations may be observed into and imagined from the network of networks of associative memory networks.

15 Claims, 28 Drawing Sheets

U.S. PATENT DOCUMENTS

| | | | |
|---|---|---|---|
| 5,245,672 | A | 9/1993 | Wilson et al. |
| 5,293,459 | A | 3/1994 | Duranton et al. |
| 5,301,257 | A | 4/1994 | Tani |
| 5,704,016 | A | 12/1997 | Shigematsu et al. |
| 5,751,571 | A | 5/1998 | Tresp et al. |
| 5,774,632 | A | 6/1998 | Kaske |
| 5,862,304 | A | 1/1999 | Ravdin et al. |
| 5,999,434 | A | 12/1999 | Yoneda et al. |
| 6,052,679 | A | 4/2000 | Aparicio, IV et al. |
| 6,169,981 | B1 | 1/2001 | Werbos |
| 6,249,449 | B1 | 6/2001 | Yoneda et al. |
| 6,369,855 | B1 | 4/2002 | Chauvel et al. |
| 6,414,726 | B1 | 7/2002 | Chauvel |
| 6,581,048 | B1 | 6/2003 | Werbos |
| 6,581,049 | B1 | 6/2003 | Aparicio, IV et al. |
| 6,999,950 | B1 | 2/2006 | Linneberg et al. |
| 6,999,952 | B1 | 2/2006 | Pham |
| 7,058,616 | B1 | 6/2006 | Larder et al. |
| 7,132,623 | B2 | 11/2006 | De Miranda et al. |
| 7,333,917 | B2 | 2/2008 | Greis et al. |
| 7,398,256 | B2 | 7/2008 | Farhat |
| 7,478,192 | B2 * | 1/2009 | Fleming et al. ............. 711/108 |
| 7,565,491 | B2 * | 7/2009 | Lemen et al. ............... 711/128 |

OTHER PUBLICATIONS

Concepts as knowledge handles in collaborative document management Voss, A.; Nakata, K.; Juhnke, M.; Enabling Technologies: Infrastructure for Collaborative Enterprises, 1999. (WET ICE '99) Proceedings. IEEE 8th International Workshops on Digital Object Identifier: 10.1109/ENABL.1999.805208 Publication Year: 1999, pp. 245-252.*

Integrating Knowledge Sources for Computer "Understanding" Tasks Cullingford, Richard E.; Systems, Man and Cybernetics, IEEE Transactions on vol. 11, Issue: 1 Digital Object Identifier: 10.1109/TSMC.1981.4308578 Publication Year: 1981, pp. 52-60.*

Estimation of Attraction Domain and Exponential Convergence Rate of Continuous Feedback Associative Memory Jinde Cao; Qiong Li; Intelligent Control and Automation 2000. Proceedings of the 3rd World Congress on vol. 2, Jun. 28-Jul. 2000 pp. 868-871 vol. 2 Digital Object Identifer 10. 1109/WCICA.2000.863355.

Invariant Recognition By Feedback Network Yongjun Zhang; Zongzhi Chen; Neural Networks, 1993. IJCNN '93-Nagoya, Proceedings of 1993 International Joint Conference on vol. 3, Oct. 25-29, 1993 pp. 2185-2188 vol. 3 Digital Object identifier: 10.1109/IJCNN.1993.714159.

A Plant Modeling with a Fuzzy Associative Memory System Goto, K.: Yamaguchi, T.; Neural Networks, 1991, IJCNN-91-Seattle International Joint Conference on vol. ii, Jul. 8-14, 1991 p. 893 vol. 2 Digital Object Identfiier 10.1109/IJCNN.1991.155469.

Holographic High Order Associative Memory System Mao, Z.Q.; Selviah, D.R.; Tao, S.; Midwinter, J.E.; Holographic Systems, Components and Applications, 1991, Third International Conference on Sep. 16-18, 1991 pp. 132-136.

Birdirectional Associative Memories Koski, B.; Systems,Man and Cybernetics, IEEE Transactions on vol. 18, Issue 1, Jan.-Feb. 1988 pp. 49-60 Digital Object Identifier 10.1109/21.87054.

Neural-net Based Megawatt-Frequency Control Lee, D.T.; Sobajic, D.J.; Pao, Y.-H.; Dolce, J.L.; Intelligent Control, 1990. Proceedings, 5th IEEE International Symposium on Sep. 5-7, 1990 pp. 1231-1236 vol. 2 Digital Object Identifier 10.1109/ISIC.1990.128610.

Bidirectional Associative Memory Networks Applied to Modeling Non-Neoclassical Economic Behaviour Garavaglia, S.; Neural Networks, 1992, IJCNN., International Joint Conference on vol. 2, Jun. 7-11, 1992 pp. 490-497 vol. 2 Digital Object Identifier 10.1109/IJCNN.1992.226940.

* cited by examiner

NETWORK OF NETWORKS OF ASSOCIATIVE MEMORY NETWORKS FOR KNOWLEDGE MANAGEMENT

CLAIM OF PRIORITY

This application is a divisional of application Ser. No. 10/980,520, filed Nov. 3, 2004, now U.S. Pat. No. 7,478,192 the disclosure of which is incorporated herein in its entirety by reference.

FEDERALLY SPONSORED RESEARCH

This invention was made at least in part with Government support under National Geospatial-Intelligence Agency Contract No. RTVGN-02-417 and Counter-Intelligence Field Activity Contract No. JCAG-CIFA-04-ST. The Government may have certain rights to this invention.

FIELD OF THE INVENTION

This invention relates to knowledge management systems, methods and computer program products, and more particularly to associative memory systems, methods and computer program products.

BACKGROUND OF THE INVENTION

Associative memories, also referred to as content addressable memories, are widely used in the field of pattern matching and identification, expert systems and artificial intelligence. A widely used associative memory is the Hopfield artificial neural network. Hopfield artificial neural networks are described, for example, in U.S. Pat. No. 4,660,166 to Hopfield entitled "*Electronic Network for Collective Decision Based on Large Number of Connections Between Signals*".

Although associative memories may avoid problems in prior back-propagation networks, associative memories may present problems of scaling and spurious memories. Recent improvements in associative memories have attempted to solve these and other problems. For example, U.S. Pat. No. 6,052,679 to coinventor Aparicio, IV et al., entitled "*Artificial Neural Networks Including Boolean-Complete Compartments*" provides a plurality of artificial neurons and a plurality of Boolean-complete compartments, a respective one of which couples a respective pair of artificial neurons. By providing Boolean-complete compartments, spurious complement memories can be avoided.

Unfortunately, there is a fundamental scaling problem that can limit the use of associative memories to solve real world problems. In particular, many associative memories scale geometrically as a function of the number of inputs. This geometric scaling may be unreasonable to support applications at the scale of complexity that warrants such technology. Scaling in associative memories is addressed in U.S. Pat. No. 6,581,049 to coinventor Aparicio, IV et al., entitled "*Artificial Neurons Including Power Series of Weights and Counts That Represent Prior and Next Associations*", and assigned to the assignee of the present invention, the disclosure of which is hereby incorporated herein by reference in its entirety as if set forth fully herein. As described in U.S. Pat. No. 6,581,049, an artificial neuron includes a plurality of inputs and a plurality of dendrites, a respective one of which is associated with a respective one of the plurality of inputs. Each dendrite comprises a power series of weights, and each weight in a power series includes an associated count for the associated power.

By representing the weights as a power series, the geometric scaling as a function of input in conventional artificial neurons can be reduced to a linear scaling as a function of input. Large numbers of inputs may be handled using real world systems, to thereby solve real world applications.

Notwithstanding the techniques described in U.S. Pat. No. 6,581,049, there continues to be a need to provide associative memory systems, methods and computer program products that can allow users to effectively mine the data that is stored in an associative memory to provide knowledge management.

SUMMARY OF THE INVENTION

Associative memory systems according to various embodiments of the present invention include a network of networks of associative memory networks. More specifically, a network of entity associative memory networks is provided. A respective entity associative memory network includes associations among a respective observer entity and a plurality of observed entities that are observed by the respective observer entity, based on a plurality of input documents. A network of feedback associative memory networks also is provided. A respective feedback associative memory network includes associations among a plurality of observed entities for a respective positive and/or negative evaluation for a respective task of a respective user. A processing system also is provided that is configured to observe associations into (i.e., write), and imagine associations from (i.e., read), the network of networks of associative memory networks.

In other embodiments of the present invention, the network of networks of associative memory networks also includes a network of document associative memory networks. A respective document associative memory network includes associations among observed entities in a respective observed input document including in a portion (segment) of an observed input document. In other embodiments, a network of community associative memory networks also is provided. A respective community associative memory network includes associations among a respective observer entity, a plurality of observed entities that are observed by the respective observer entity, and a plurality of observed tasks of a plurality of users in which the observer entity was queried.

In still other embodiments of the present invention, the processing system includes an observer system and a query system. The observer system is configured to observe into the network of entity associative memory networks, the associations among a respective observer entity and a plurality of observed entities that are observed by the respective observer entity, based on the plurality of input documents. The observer system also is configured to observe into the network of feedback associative memory networks, the associations among a plurality of observed entities for a respective observer positive and/or negative evaluation for a respective task of a respective user. The query system is configured to imagine associations of entities, users and/or tasks from the network of entity associative memory networks and the network of feedback associative memory networks in response to user queries.

In other embodiments of the invention, the observer system also is configured to observe into the network of document associative memory networks, the associations among observed entities in a respective observer input document. The observer system is also configured to observe into the network of community associative memory networks, the associations among a respective observer entity, a plurality of observed entities that are observed by the respective observer entity, and a plurality of observed tasks of the plurality of users in which the observer entity was queried. The query system also may be configured to imagine associations of entities, documents, users and/or tasks from the network of associative memory networks, the network of document associative memory networks, the network of feedback associative memory networks, and the network of community associative memory networks, in response to user queries.

In other embodiments, the observer system includes an entity observer and a document observer. The entity observer is configured to observe into the network of entity associative memory networks, the associations among a respective observer entity and a plurality of observed entities that are observed by the respective observer entity, based on the plurality of input documents. The document observer is configured to observe into the network of document associative memory networks, the associations among observed entities in a respective observer input document.

In other embodiments, the observer system also includes a feedback observer and a community observer. The feedback observer is configured to observe into the network of feedback associative memory networks, the associations among a plurality of observed entities for a respective observer positive and/or negative evaluation for a respective task of a respective user. The community observer is configured to observe into the network of community associative memory networks, the associations among a respective observer entity, a plurality of observed entities that are observed by the respective observer entity and a plurality of observed tasks of a plurality of users in which the observer entity was queried.

In some embodiments, the processing system also includes a plurality of itineraries, and a controller that is configured to control the processing system to observe associations into, and imagine associations from, the network of networks of associative memory networks, according to a selected one of the itineraries. A whiteboard also may be provided that is configured to store intermediate results that are produced by the processing system.

In other embodiments, a reader system also is provided that is responsive to the input documents and is configured to produce document IDs and/or other identifiers such as segment IDs and document data therefrom. A parser is responsive to the document data and is configured to extract entities from the document data. A context generator is responsive to the parser and is configured to identify observer entities and observed entities from the entities that are extracted, and to provide the observer entities and observed entities to the entity observer and the document observer. In these embodiments, the controller may be further configured to control the reader system, the parser and the context generator according to a document itinerary, and the whiteboard is further configured to store intermediate results that are produced by the reader system, the parser and the context generator.

In other embodiments, a task input system is provided that is responsive to selected data that has received a positive and/or negative evaluation from a respective user during a respective task, and is configured to produce user-task IDs, related positive and/or negative evaluations and related selected data therefrom. A parser is responsive to the task input system, and is configured to extract entities from the related positive and/or negative evaluations and related selected data. A context generator is responsive to the parser, and is configured to identify observer entities and observed entities from the entities that are extracted and to provide the observer entities and observed entities to the feedback observer. In these embodiments, the controller may be further configured to control the task input system, the parser and the context generator according to a feedback itinerary, and the whiteboard is further configured to store intermediate results that are produced by the task input system, the parser and the context generator.

In still other embodiments of the present invention, a task input system is provided that is responsive to selected data that has received a positive and/or negative evaluation from a respective user during a respective task, and is configured to produce user-task IDs, related positive and/or negative evaluations and related selected data therefrom. A parser is provided that is responsive to the task input system, and is configured to extract entities from the related positive and/or negative evaluations and related selected data. A context generator is responsive to the parser and is configured to identify observer entries and observed entries from the entities that are extracted and to provide the observer entities and observed entities to the community observer. In these embodiments, the controller may be further configured to control the task input system, the parser and the context generator according to a feedback itinerary, and the whiteboard is further configured to store intermediate results that are produced by the task input system, the parser and the context generator.

In still other embodiments of the present invention, the query system includes an entity query system, a document query system and community query system. The entity query system is configured to query the network of entity associative memory networks and the network of feedback associative memory networks to imagine associations of entities and user-task positive and/or negative evaluations, in response to user queries. The document query system is configured to query the network of document associative memory networks and the network of feedback associative memory networks to imagine associations of documents and user-task positive and/or negative evaluations, in response to user queries. The community query system is configured to query the network of community associative memory networks to imagine associations of other user-tasks, in response to user queries.

In some embodiments, the processing system further comprises a task input system that is responsive to user queries and is configured to produce user-task IDs and query data therefrom. A parser is responsive to the task input system, and is configured to extract entities from the query data. A context generator is responsive to the parser, and is configured to identify observer entities and observed entities from the entities that are extracted, and to provide the observer entities and observed entities to the entity query system, the document query system and the community query system. The controller may be further configured to control the task input system, the parser and context generator according to a query itinerary, and the whiteboard is configured to store intermediate results that are produced by the task input system, the parser and the context extractor.

In some embodiments of the present invention, the query system is further configured to identify entities, associations, documents, users and/or tasks that are not known to a given user, in response to a query by the given user. In other embodiments, the query system is further configured to identify entities, associations and/or documents that were evaluated to be interesting to another user, in response to a query by a given user.

According to other embodiments of the present invention, the network of networks of associative memory networks further comprises a network of directory memory associative memory networks. A respective directory memory associative network includes associations among a respective observer entity and a plurality of observed non-entity attributes that are observed by the respective observer entity, based on a plurality of input documents.

Embodiments of the present invention can provide knowledge management systems that include an associative memory system and an observer system. The observer system is configured to observe associations among user queries, results of user queries, and user evaluations of results of user queries for a plurality of users, into the associative memory system. In other embodiments, a query system also is provided that is configured to imagine associations from the associations among user queries, results of user queries and user evaluations of results of user queries for a plurality of users that were observed into the associative memory system, in response to a query by a given user.

It will be understood that embodiments of the invention have been described above primarily with respect to system embodiments. However, analogous method embodiments and/or analogous computer program product embodiments also may be provided.

DETAILED DESCRIPTION

Figure 1:
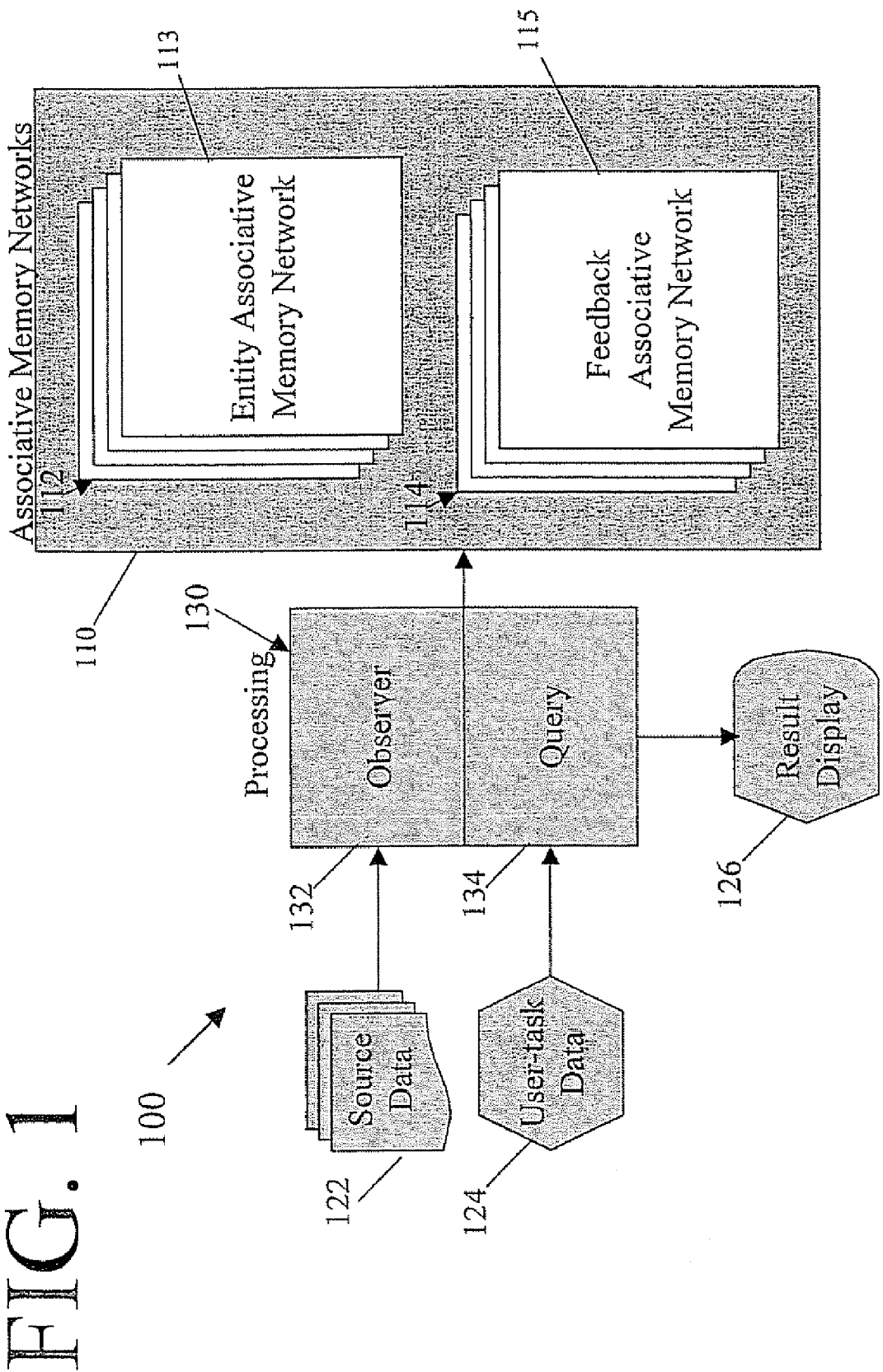
FIGS. 1 and 2 are block diagrams of associative memory systems, methods and/or computer program products according to various embodiments of the present invention.

The present invention now will be described more fully hereinafter with reference to the accompanying drawings, in which illustrative embodiments of the invention are shown. However, this invention may be embodied in many different forms and should not be construed as limited to the embodiments set forth herein. Rather, these embodiments are provided so that this disclosure will be thorough and complete, and will fully convey the scope of the invention to those skilled in the art.

It will be understood that when an element is referred to as being "coupled", "connected" or "responsive" to another element, it can be directly coupled, connected or responsive to the other element or intervening elements may also be present. In contrast, when an element is referred to as being "directly coupled", "directly connected" or "directly responsive" to another element, there are no intervening elements present. Like numbers refer to like elements throughout. As used herein the term "and/or" includes any and all combinations of one or more of the associated listed items and may be abbreviated by "/".

It will also be understood that, although the terms first, second, etc. may be used herein to describe various elements, these elements should not be limited by these terms. These terms are only used to distinguish one element from another element.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention is described in part below with reference to block diagrams and flowcharts of methods, systems and computer program products according to embodiments of the invention. It will be understood that a block of the block diagrams or flowcharts, and combinations of blocks in the block diagrams or flowcharts, may be implemented at least in part by computer program instructions. These computer program instructions may be provided to one or more enterprise, application, personal, pervasive and/or embedded computer systems, such that the instructions, which execute via the computer system(s) create means, modules, devices or methods for implementing the functions/acts specified in the block diagram block or blocks. Combinations of general purpose computer systems and/or special purpose hardware also may be used in other embodiments.

These computer program instructions may also be stored in memory of the computer system(s) that can direct the computer system(s) to function in a particular manner, such that the instructions stored in the memory produce an article of manufacture including computer-readable program code which implements the functions/acts specified in block or blocks. The computer program instructions may also be loaded into the computer system(s) to cause a series of operational steps to be performed by the computer system(s) to produce a computer implemented process such that the instructions which execute on the processor provide steps for implementing the functions/acts specified in the block or blocks. Accordingly, a given block or blocks of the block diagrams and/or flowcharts provides support for methods, computer program products and/or systems (structural and/or means-plus-function).

It should also be noted that in some alternate implementations, the functions/acts noted in the flowcharts may occur out of the order noted in the flowcharts. For example, two blocks shown in succession may in fact be executed substantially concurrently or the blocks may sometimes be executed in the reverse order, depending upon the functionality/acts involved. Finally, the functionality of one or more blocks may be separated and/or combined with that of other blocks.

FIG. 1 is a block diagram of associative memory systems, methods and/or computer program products according to various embodiments of the present invention. As shown in FIG. 1, associative memory systems, methods and/or computer program products 100 according to various embodiments of the present invention include a network 110 of networks 112, 114 of associative memory networks 113, 115. The network 110 of networks 112, 114 of associative memory networks 113, 115 includes a network 112 of entity associative memory networks 113, and a network 114 of feedback associative memory networks 115. A respective entity associative memory network 113 includes therein associations among a respective observer entity and a plurality of observed entities that are observed by the respective observer entity, based on a plurality of input documents, also referred to as source data 122. It will be understood that the term "document" is used herein to refer to a collection of source data, regardless of the form or medium in which the source data is contained. Thus, the term "document" can include database records and other source data as well. A respective feedback associative memory network 115 includes therein associations among a plurality of observed entities for a respective observer positive and/or negative evaluation for a respective task of a respective user. The respective tasks of the respective users are provided by user-task data 124. User-task data 124 may be produced as a result of a user query, as will be described in detail below.

Still referring to FIG. 1, a processing system, method and/or computer program product 130 is provided. The processing system, method and/or computer program product 130 is configured to observe associations into, and imagine associations from, the network 110 of networks 112, 114 of associative memory networks 113, 115. The processing system, method and/or computer program product 130 includes an observer system, method and/or computer program product 132 and a query system, method and/or computer program product 134. The observer system, method and/or computer program product 132 is configured to observe into the network 112 of entity associative memory networks 113, the associations among a respective observer entity and a plurality of observed entities that are observed by the respective observer entity, based on the plurality of input documents 122, and to observe into the network 114 of feedback associative memory networks 115, the associations among a plurality of observed entities for a respective observed positive and/or negative evaluation for a respective task of a respective user. The query system, method and/or computer program product 134 is configured to imagine associations of entities, users and/or tasks from the network 112 of entity associative memory networks 113 and the network 114 of feedback associative memory networks 115, in response to user queries. Results of user queries may be configured for display by a result display 126.

Each of the entity associative memory networks 113 and feedback associative memory networks 115 may be embodied using an associative memory network of the above-cited U.S. Pat. No. 6,052,679. These associative memory networks may scale linearly or almost linearly, and thereby allow large networks of associative memories to be provided. However, in other embodiments of the present invention, other associative memory architectures may be used.

Figure 2:
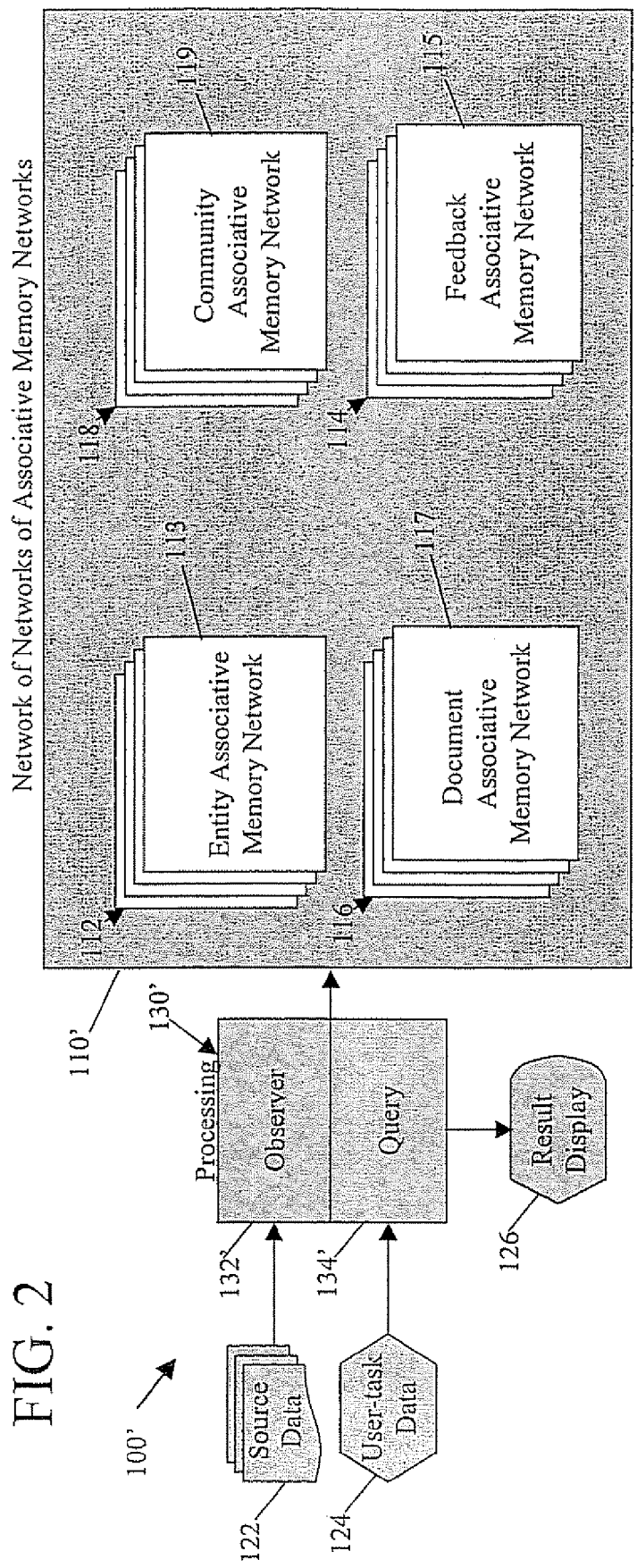

FIG. 2 is a block diagram of associative memory systems, methods and/or computer program products 100' according to other embodiments of the present invention. As shown in FIG. 2, the network 110' of networks 112, 114, 116, 118 of associative memory networks 113, 115, 117, 119 also includes a network 116 of document associative memory networks 117, and a network 118 of community associative memory networks 119. A respective document associative memory network 117 includes associations among observed entities in a respective observer input document, including in a portion (segment) of an observed input document. Moreover, a respective community associative memory network 119 includes therein associations among a respective observer entity, a plurality of observed entities that are observed by the respective observer entity, and a plurality of observed tasks of a plurality of users in which the observer entity was queried.

Still referring to FIG. 2, the processing system, method and/or computer program product 130' of FIG. 2 may include the functionality of the processing system, method and/or computer program product 130 of FIG. 1. Moreover, the observer system, method and/or computer program product 132' of FIG. 2 may also add the functionality of observing into the network 116 of document associative memory networks 117 the associations among observed entities in a respective observer input document, and to observe into the network 118 of community associative memory networks 119 the associations among a respective observer entity, a plurality of observed entities that are observed by the respective observer entity and a plurality of observed tasks of a plurality of users in which the observer entity was queried. Moreover, the query system, method and/or computer program product 134' may also add functionality to imagine associations of entities, documents, users and/or tasks from the network 112 of entity associative memory networks 113, the network 114 of feedback associative memory networks 115, the network 116 of document associative memory networks 117 and the network 118 of community associative memory networks 119, in response to user queries. Results of user queries may be configured for display by the result display 126.

It will be understood that the processing system, method and/or computer program product 130, 130' may be embodied as one or more enterprise, application, personal, pervasive and/or embedded computer systems that may be connected by a wired and/or wireless network. The processing system, method and/or computer program product 130, 130' may also include one or more general purpose data processors that execute one or more stored programs, special purpose processors and/or special purpose hardware. For ease of nomenclature, a given system, method and/or computer program product that is illustrated in the drawings may also be referred to herein as a "block". Moreover, the network 110, 110' of networks of associative memory networks may be stored in one or more general purpose memory devices and/or special purpose memory devices. These memory devices may represent an overall hierarchy of memory devices containing software and/or data used to implement the network 110, 110' of networks of associative memory networks. The memory can include, but is not limited to, the following types of devices: cache, ROM, PROM, EPROM, EEPROM, flash memory, SRAM and/or DRAM.

Figure 3:
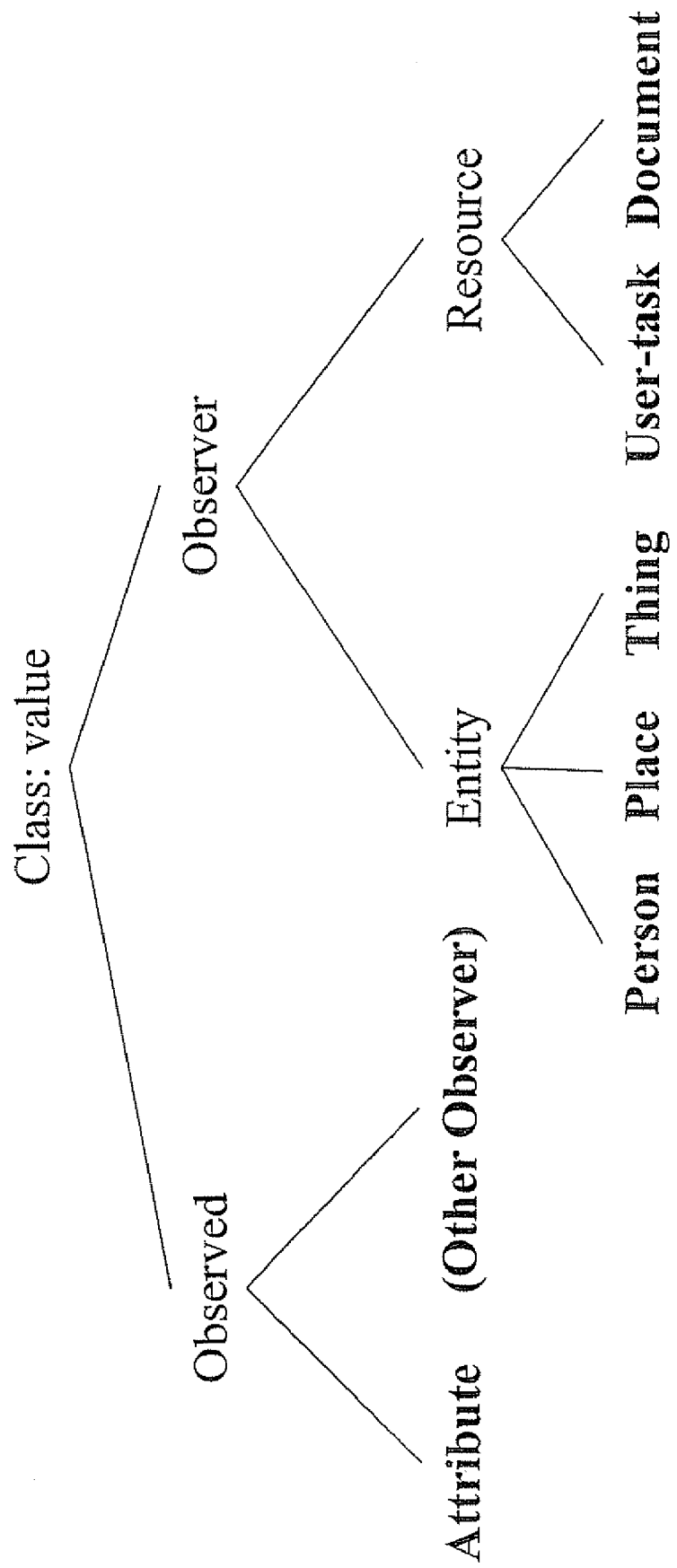
FIG. 3 illustrates an element name taxonomy according to exemplary embodiments of the present invention.

Additional details of the organization and operation of the network 110, 110' of associative memory networks will now be provided. However, in order to ensure that the terminology used herein is understood by those having skill in the art, a taxonomy for the element names used herein is first provided in FIG. 3. As shown in FIG. 3, the classes of elements that are contained in the network 110, 110' of networks of associative memory networks include "observer" classes and "observed" classes. Thus, for example, when source data 122 is observed into the network 110, 110' of entity associative memory networks, a separate entity associative memory network 113 is provided for associations among a given observer entity and a plurality of observed entities that are observed by the observer entity. Thus, an observer denotes an entity (or other class) from whose perspective observed entities (or other classes) are stored in an associative memory network. By providing a plurality of entity associative memory networks 113, a respective one of which is arranged from the perspective of a respective observer entity, contextual associations may be provided among observer entities and observed entities. As used herein, the term "entity" includes a person, place or thing.

Figure 4:
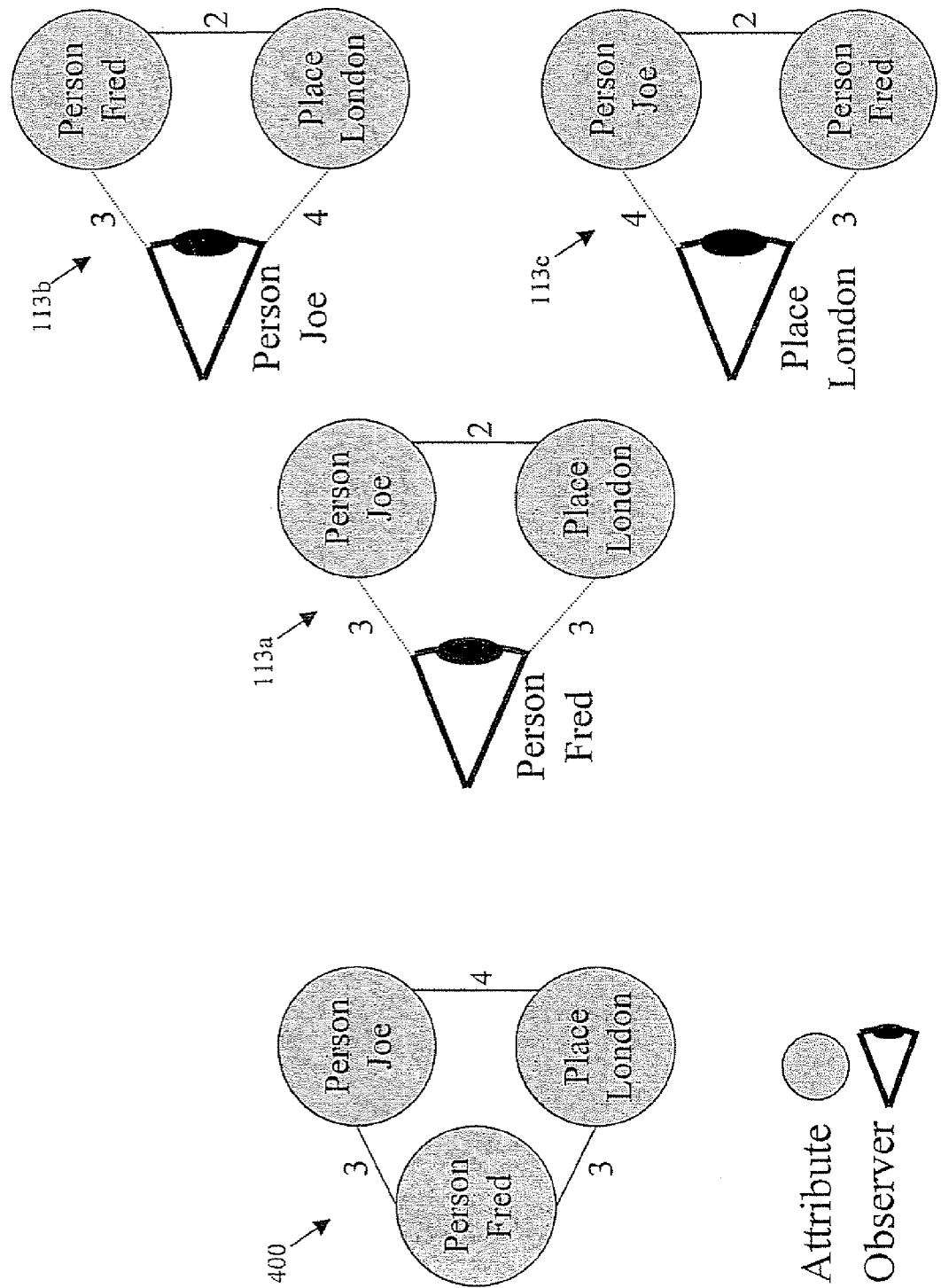
FIG. 4 provides illustrative examples of observer and observed entities according to various embodiments of the present invention, in contrast with conventional arrangements of associative memories.

A simple illustration of observer and observed entities will be provided in connection with FIG. 4 and will be contrasted with conventional arrangements of associative memories. FIG. 4 illustrates a conventional associative memory network 400, which observes associations among entities (persons, places or things). Specifically, associations between the entities Person: Fred, Person: Joe and Place: London, are shown with the number of associations indicated by lines connecting the entities. It has been recognized, according to some embodiments of the present invention, that much information may be lost when mapping associations among these three entities in a conventional manner. For example, the associative memory network 400 of FIG. 4 may not be able to distinguish whether Fred and Joe have been to London three times together, or whether Fred and Joe have met three times, traveling separately to London, or whether Fred and Joe met three times, twice in London.

In sharp contrast, FIG. 4 also illustrates three entity associative memory networks 113a, 113b, 113c according to exemplary embodiments of the present invention. As was already noted, each entity associative memory network 113 includes associations among a respective observer entity (shown by an "eyeball" in FIG. 4) and a plurality of observed entities (shown by circles in FIG. 4), that are observed by the respective observer entity, based on a plurality of input documents. Thus, as documents are observed into the system, they are observed from the perspective of Person: Fred (entity associative memory network 113a), from the perspective of Person: Joe (entity associative memory network 113b) and from the perspective of Place: London (entity associative memory network 113c). As a given input document (or segment of an input document) is observed, it is observed into each of the entity associative memory networks 113a, 113b, 113c from the context of Person: Fred, Person: Joe and Place: London as an observer entity, with the other entities in the document (or segment of the document) being observed entities. By observing associations among entities in input documents into a plurality of entity associative memory networks from the perspective of a respective observer entity, the above-posed question can be answered that, in fact, Fred and Joe met three times, twice in London. Accordingly, by providing a network of contextual associative memory networks, additional knowledge can be obtained that may not otherwise be obtainable when associations are stored in a single associative memory network.

Returning to FIG. 3, the difference between an observed and an observer class has now been described. Referring to the taxonomy of FIG. 3, an observed class may include observed attributes, and an observed class may include classes of observers as well. As used herein, an "attribute" is any data term and/or concept in a document, other than an entity, such as a verb. As shown in FIG. 3, an observer class may include an entity class and a resource class. As used herein, the term "resource" refers to a user-task or a document. Additional details and many examples will be provided below. Thus, as shown in FIG. 3, a given entity (person, place or thing), user task or document can act as an observer class in one associative memory network and an observed class in another associative memory network. For example, Person. Fred is the observer in entity associative memory network 113a of FIG. 4, but is an observed class in entity associative memory networks 113b and 113c. In some embodiments, other attributes that are not entities, such as verbs, may be observed classes, but not an observer class. However, in other embodiments, attributes may be an observer class as well. Thus, in some embodiments of the present invention, the observer class can include entities and resources, attributes and/or other observers.

Figure 5:
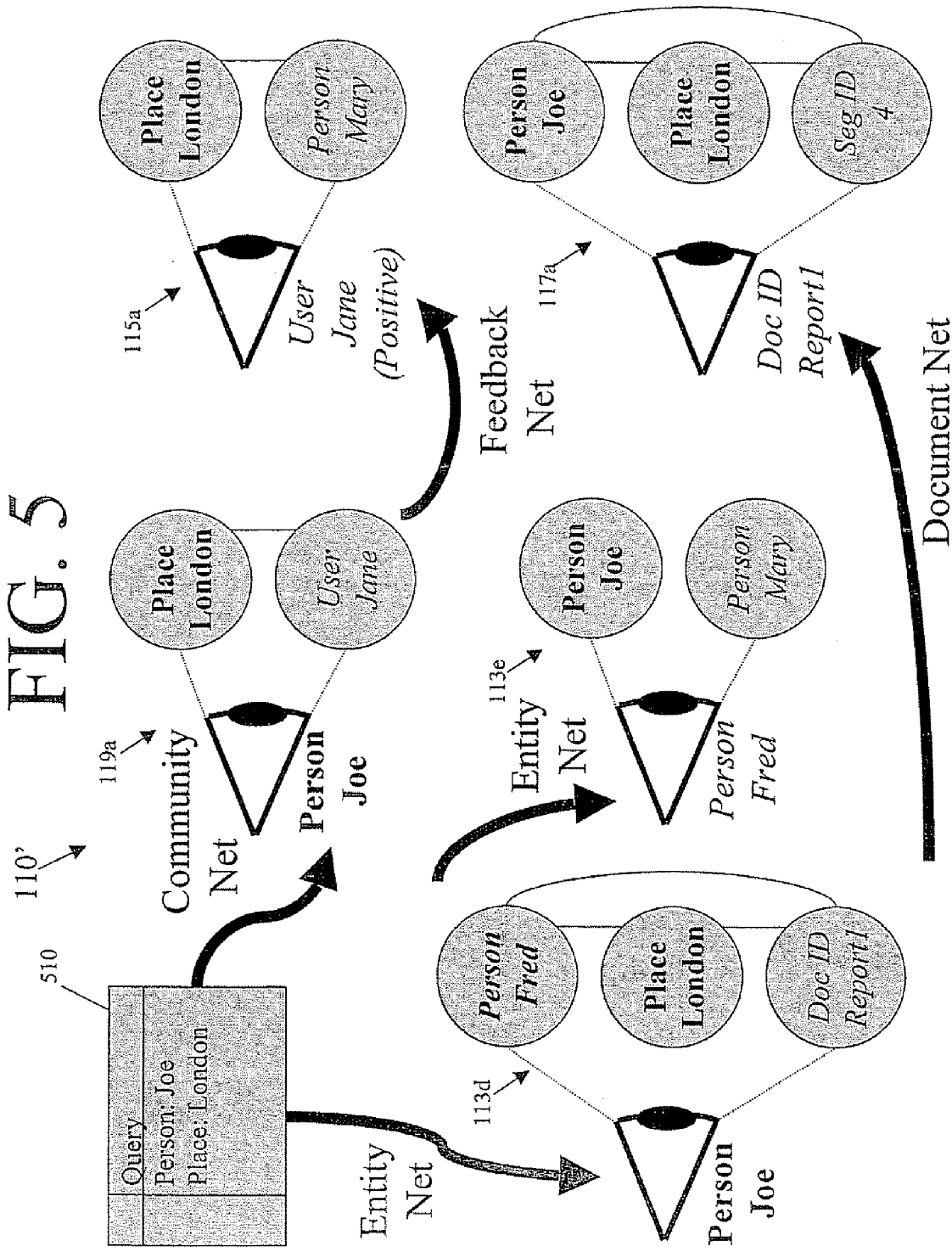
FIG. 5 provides an illustrative example of knowledge management that can be obtained by providing a network of networks of associative memory networks according to various embodiments of the present invention.

FIG. 5 provides another example of knowledge management that can be obtained by providing a network 110' of networks of associative memory networks of FIG. 2. In particular, FIG. 5 illustrates a simplified example of a network 110' of networks of associative memory networks that includes a single community associative memory network 119a, referred to in FIG. 5 simply as "community net", two entity associative memory networks 113d and 113e, referred to in FIG. 5 simply as "entity net", a feedback associative memory network 115a, referred to in FIG. 5 as a "feedback net" and a document associative memory network 117a, referred to in FIG. 5 as a "document net".

As shown in FIG. 5, the entity nets 113d, 113e include associations among an observer entity and a plurality of observed entities that are observed by the respective observer entity. A reference to a document ID ("Report1") also may be included as a resource. The document net 117a includes an observer document ID (Report1) and the observed attributes, entities or resources in the document. The community net 119a includes associations among a respective observer entity and a plurality of observed entities including a user of the associative memory system, Jane. Finally, the feedback net 115a includes associations among a plurality of entities for a positive evaluation for user Jane.

As shown in FIG. 5, a query 510 of associations between Person: Joe and Place: London causes entity net 113d to imagine Person: Fred and causes entity net 113e to imagine Person: Joe and Person: Mary. Doc ID: Report1 is also imagined by entity net 113d. The community net 119a also identifies a user of the system User: Jane as being interested in associations between Person: Joe and Place: London, and the feedback net 115*a* identifies that the user Jane has evaluated that there is a positive association between Place: London and Person: Mary. Accordingly, the result of this query has identified Person: Mary as being associated with Person: Joe and Place: London, and being identified by a user of the system as having a positive evaluation. New information not known by the query submitter has, therefore, been identified, and this information also has been identified as being "interesting" by another user of the system.

Accordingly, FIG. 5 provides an example of knowledge management systems, methods and computer program products according to various embodiments of the present invention that include an associative memory system and an observation system that is configured to observe associations among user queries, results of user queries and user evaluations of results of user queries for a plurality of users, into the associative memory system. FIG. 5 also illustrates imagining systems, methods or computer program products that are configured to imagine new and interesting associations from the associations among user queries, results of user queries and user evaluations of results of user queries for a plurality of users that are observed into the associative memory system, in response to a query by a given user.

Figure 6:
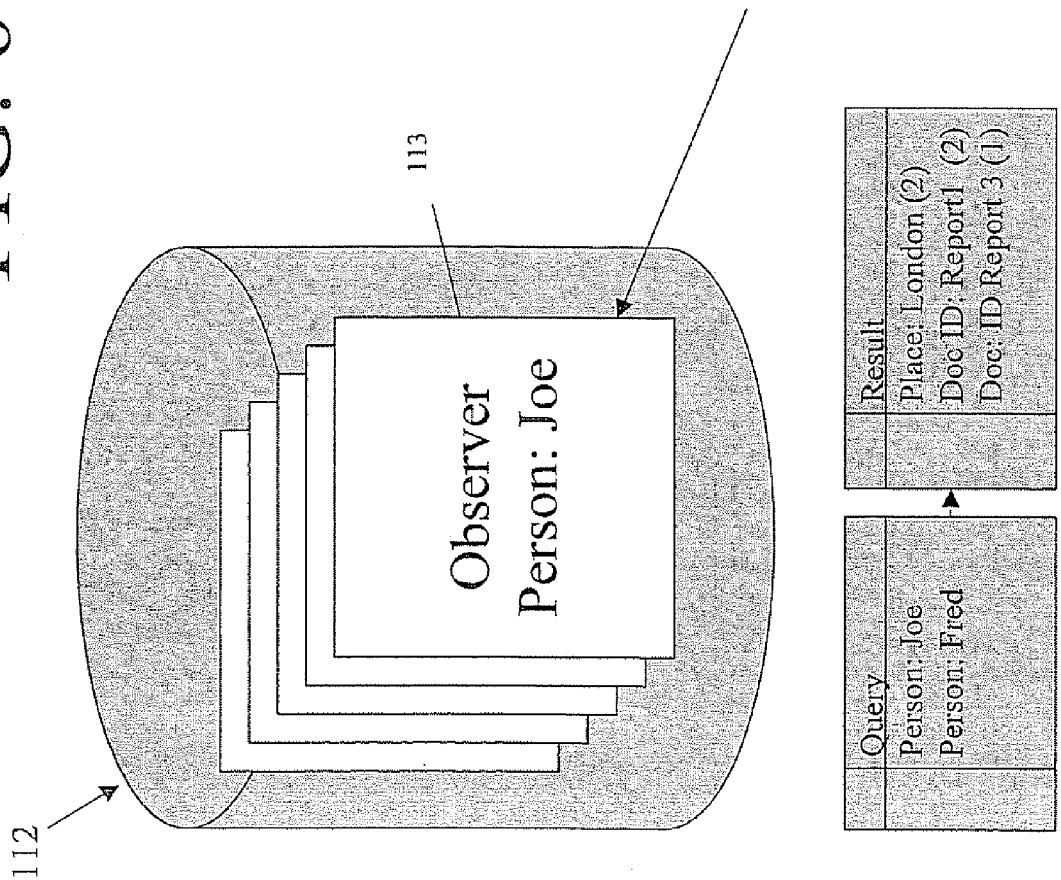
FIG. 6 illustrates an example architecture of a network of entity associative memory networks according to various embodiments of the present invention.

FIG. 6 provides another example of an architecture of a network 112 of entity associative memory networks 113 according to exemplary embodiments of the present invention. As shown in FIG. 6, a respective entity associative memory network 113 includes associations among a respective observer entity (Person: Joe) and a plurality of observed entities (Person: Fred, Place: London) and, optionally, other resources such as documents (Doc ID: Report3, Doc ID: Report1). As is well known to those having skill in the art, these associations may be represented conceptually as a graph (as was the case in FIGS. 4 and 5), or as a matrix, as is the case in FIG. 6. The diagonal of the matrix indicates the total number of associations between the observer entity or resource and the respective observed entity or resource. FIG. 6 also illustrates an exemplary query that is applied to the network 112 of entity associative memory networks 113 and the result that is obtained based on the matrix shown in FIG. 6. The result is also shaded in the matrix of FIG. 6.

Thus, a respective entity associative memory network 113 includes associations among a respective observer entity and other observed entities that are found in a plurality of input documents. Thus, the network 112 of entity associative memory networks 113 can model the input documents by modeling the entity associations and providing a link to the documents where the associations were found. An associative memory network 113 is provided for each entity that is extracted from the input documents. Each observer entity has an associative memory network 113 to track associations with each other observed entity. Various resources and/or attributes also may be included in the associations. For example, a Doc ID resource indicates which document included the association. Since the entity memories are associative memories, they may provide a relevant entity/document query function that can locate and rank relevant entities/documents, given some search context. Moreover, a context enhancer function also may be provided that can locate related or relevant entities to augment a user's search context. Observation statistics also may be provided. These observation statistics can provide, for example, entity-based statistics, a number of observations, an average context size, a number of entity associations, a number of keyword associations, association-based statistics and/or a number of observations of an entity-entity association.

Figure 7:
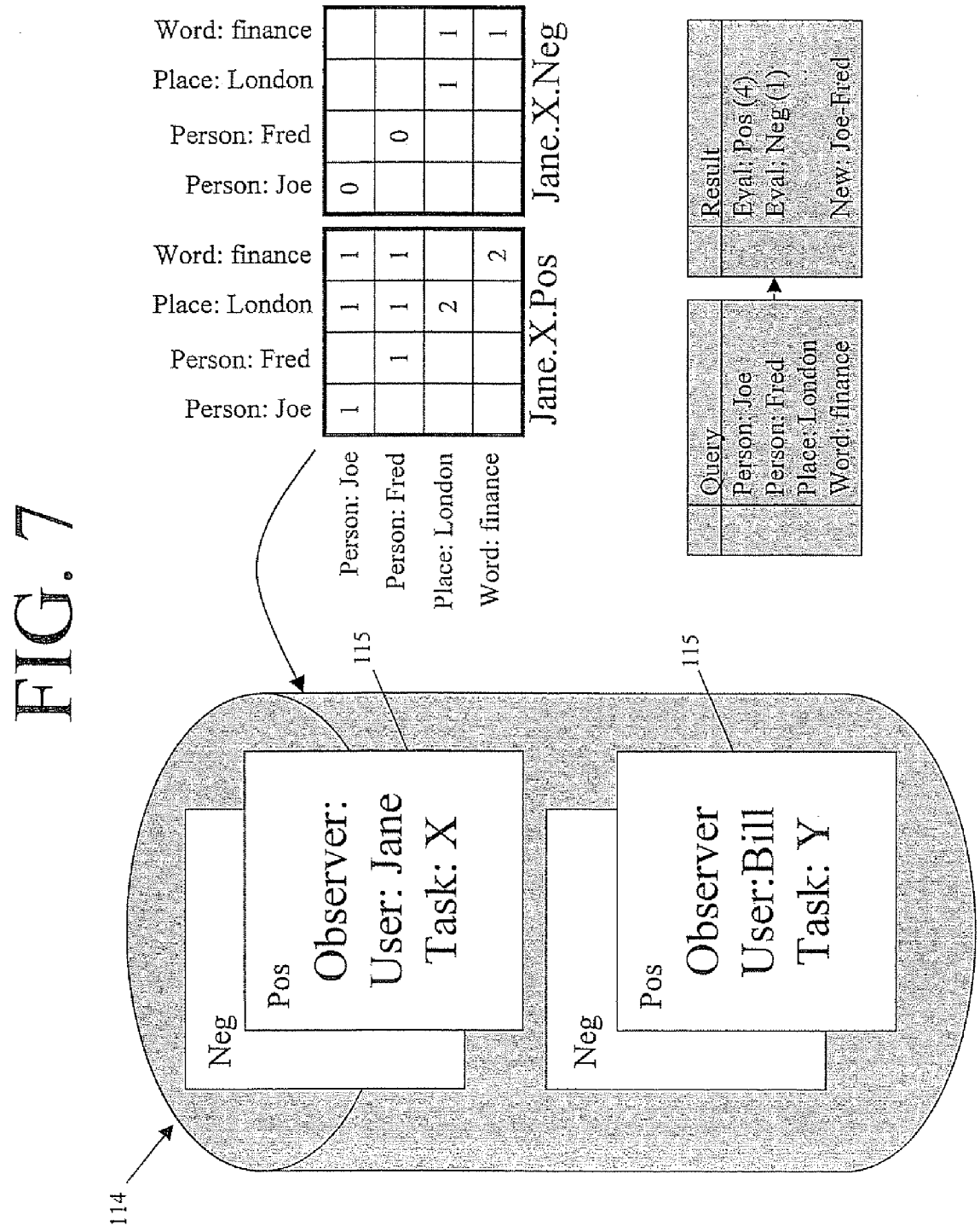
FIG. 7 illustrates an example architecture of a network of feedback associative memory networks according to various embodiments of the present invention.

FIG. 7 illustrates another example of a network 114 of feedback associative memory networks 115. As shown in FIG. 7, a respective feedback associative memory network 115 includes associations among entities, and may also include attributes and/or resources, for a respective positive and/or negative evaluation for a respective task of a respective user. In FIG. 7, the observer is User: Jane and Task: X or User: Bill and Task: Y, and a positive and negative feedback memory is provided for each user:task. As shown in the matrices of FIG. 7, the Jane.X.Pos associative memory network provides associations between Person: Joe, Person: Fred, Place: London and Word: finance in the context of User: Jane and Task: X, where positive feedback was given by User: Jane during Task: X. The negative associative memory network provides associations where negative feedback was provided by User: Jane during Task: X. As also shown in FIG. 7, a query of Person: Joe, Person: Fred, Place: London and Word: finance provides four positive evaluations and one negative evaluation. Because of the large number of positive evaluations relative to negative evaluations, a "new" association between Joe and Fred is generated. The generation of new associations will be described in more detail below.

Thus, the network 114 of feedback associative memory networks 115 allow the storage of user models as an associative network. The feedback memories 115 may be organized by providing a feedback associative memory network 115 for each user of the system. Each user can be provided with one memory 115 per task, and each task memory can have two responses for feedback (referred to herein as "positive" and "negative", "pos" and "neg", "+" and "−", or "good" and "bad"). One associative memory may be provided for a user's "lifetime" experience. The feedback memories 115 may be configured to provide a familiarity score, which allows a query of a user's lifetime experience memory for how often the user has worked with an entity or document. A relevance score also may be provided by querying the feedback memory 115 to compute the strength of association between a given entity and a task, using personal feedback knowledge to capture positive (relevant) and negative (irrelevant) feedback for an entity, document or association for a current task.

Figure 8:
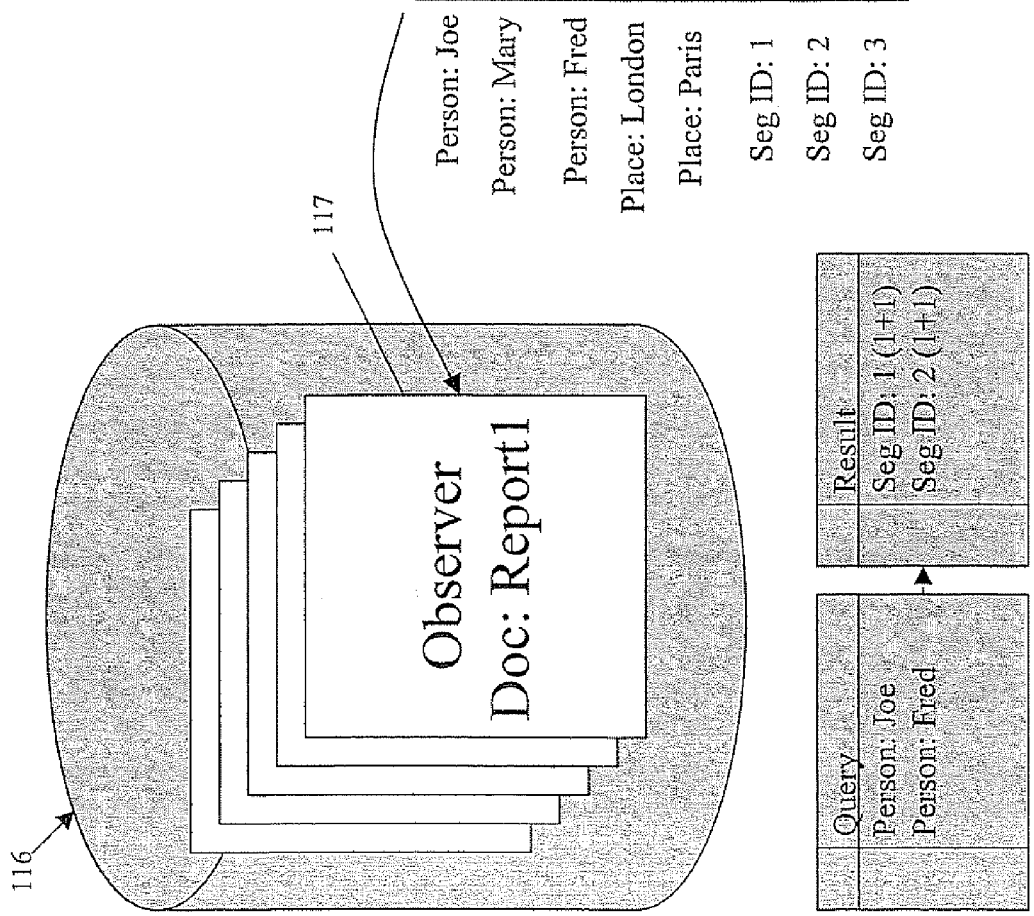
FIG. 8 illustrates an example architecture of a network of document associative memory networks according to various embodiments of the present invention.

FIG. 8 provides another example of a network 116 of document associative memory networks 117. As shown in FIG. 8, in some embodiments of the present invention, the observer for a document associative memory network 117 is a single given document, shown in FIG. 8 as Report1. The document may be broken into segments, which may, in some embodiments, correspond to paragraphs, although in other embodiments, segments may correspond to sentences or larger or smaller portions of a document. Entities (Person: Joe, Person: Mary, Person: Fred, Place. London and Place: Paris) are also provided within the context of document. Thus, a query of the network of document associative memory networks relative to Person: Joe and Person: Fred will imagine Segment ID: 1 and Segment ID: 2.

Thus, the network 116 of document associative memory networks 117 observe associations among entities and segments in a given document. An associative memory network 117 is provided for each document that is ingested. Attributes of the document memories include a segment ID, which indicates which document section (such as paragraph or sentence) established the association. The network 116 of document memory associative memory networks 117 can allow a document details query to be performed, which locates a specific document subsection that established a relationship. Moreover, the entity associative memory networks 113 need only contain document IDs, and need not contain specifics of a document. By providing the document memories 117, finegrained resolution down to a paragraph or sentence may be provided. Moreover, when coupled with a document metadata relational database, reference highlighting can be displayed.

Figure 9:
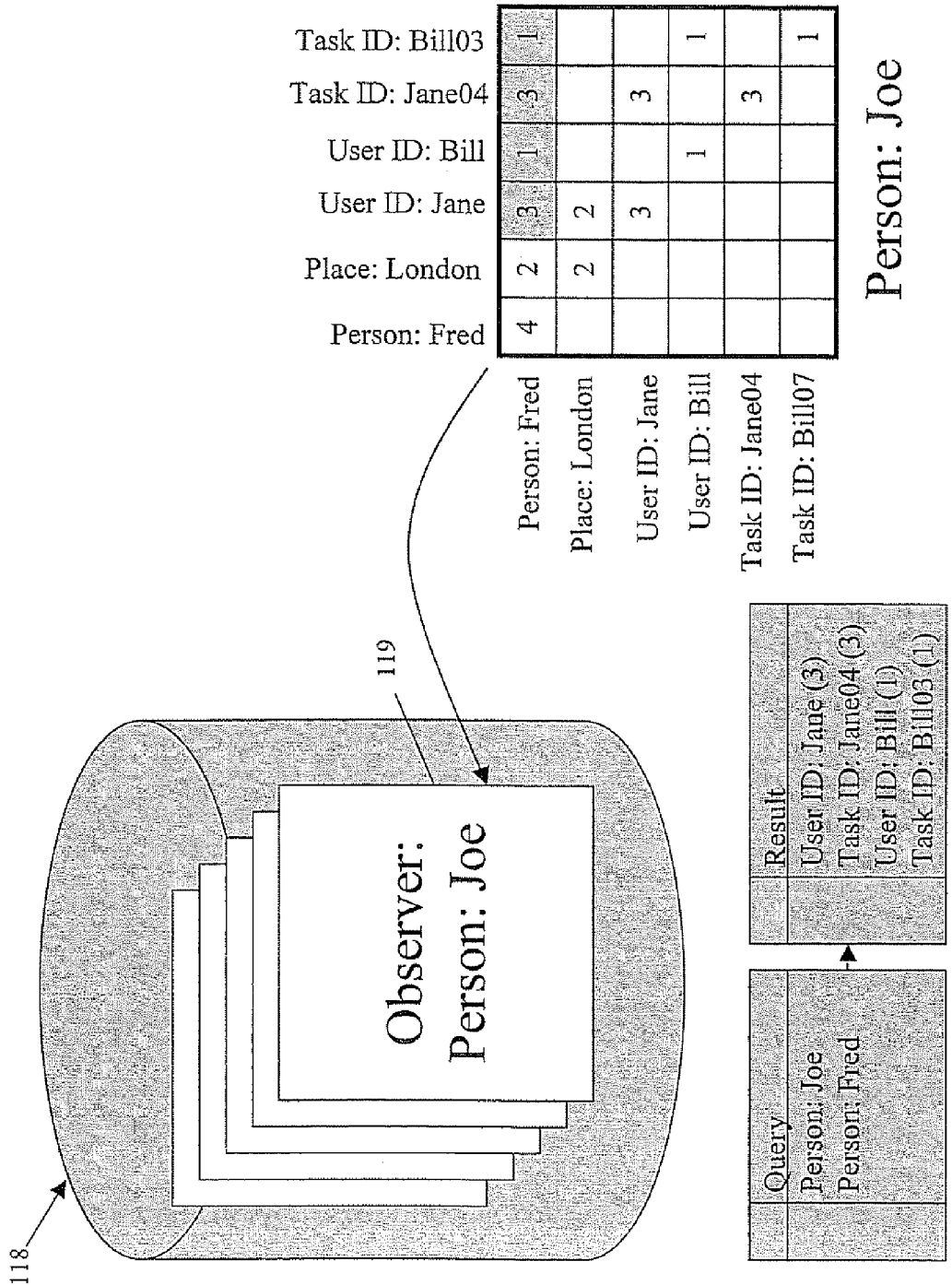
FIG. 9 illustrates an example architecture of a network of community associative memory networks according to various embodiments of the present invention.

FIG. 9 provides another example of a network 118 of community associative memory networks 119. As shown by the matrix of FIG. 9, each community associative memory network 119 contains associations from the perspective of an observer (Person: Joe in FIG. 9), and includes observed entities (Person: Fred, Place: London) and resources, such as users and/or tasks (User ID: Jane, User ID: Bill, Task ID: Jane04, Task ID: Bill03). As also shown in FIG. 9, a query on Person: Joe and Person: Fred imagines user IDs and task IDs where other users of the system were also interested in these associations.

Thus, the network 118 of community associative memory networks 119, model the task specific data of users, such as associated entities and the user who published them. The community memories 119 may be organized in the same way as the entity memories 113, but only a subset of the observers may be included based upon the task-specific data of the users. A community associative memory network 119 may be provided for each entity found in the user's tasks (that was marked as relevant). Resources may include user IDs and user-task IDs. The community memories 119 may be configured to respond to a user query, by locating and ranking relevant users by performing a pattern complete. A popularity score also may be provided by scoring documents, entities, etc., based on how often they appear in all user's tasks. The score can be a total observation count or a percentage of users who are using the entity, document, etc.

Figure 10:
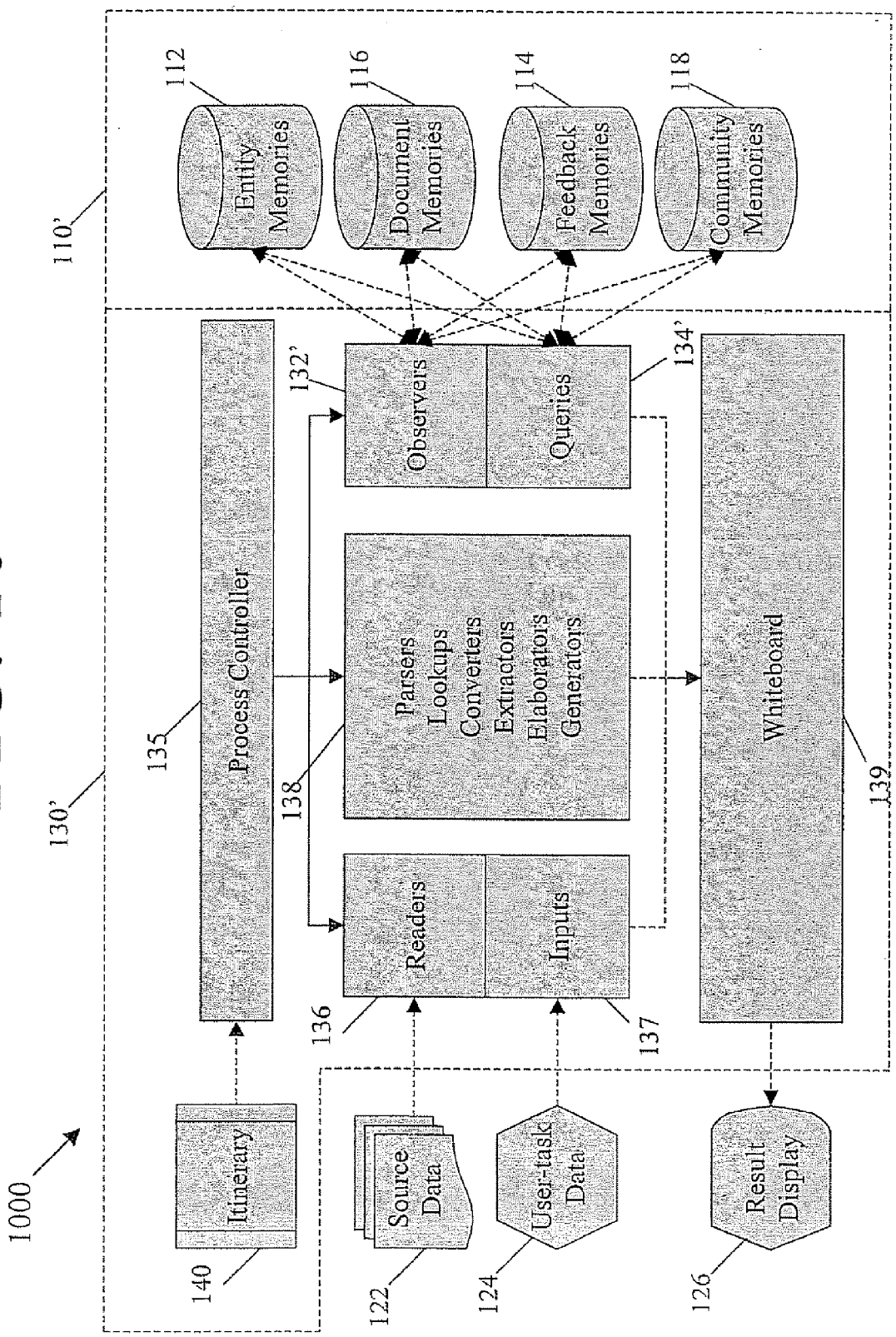
FIG. 10 is a block diagram of associative memory systems, methods and/or computer program products according to various other embodiments of the present invention.

FIG. 10 is a block diagram of associative memory systems, methods and/or computer program products 1000 according to other embodiments of the present invention. Compared to FIG. 2, FIG. 10 provides additional details of processing systems, methods and/or computer program products 130', according to various embodiments of the present invention. In FIG. 10 and in the figures which follow, the network 112 of entity associative memory networks is simply referred to as "entity memories" 112. The network 114 of feedback associative memory networks is simply referred to as "feedback memories" 114. The network 116 of document associative memory networks is simply referred to as "document memories" 116. The network 118 of community associative memory networks is simply referred to as "community memories" 118. Moreover, the observer systems, methods and/or computer program products 132' of FIG. 2 are simply referred to as "observers" 132' and the query systems, methods and/or computer program products 134' of FIG. 2 are simply referred to as "queries" 134'.

It will also be understood that, as used herein, the term "Observer" can have one of two meanings. A first meaning is a class of entities and/or resources which provide a context for an associative memory network relative to a plurality of observed entities, resources and/or attributes, as was described, for example, in the taxonomy of FIG. 3, and in FIGS. 4-9. The second meaning is a system, method or computer program product 132, 132' that is configured to observe (write) associations into the network of networks of associative memory networks 110 or 110', as was described, for example, in FIGS. 1-2 and 10. These different meanings will be apparent to those having skill in the art depending on the manner in which the term is used.

Continuing with the description of FIG. 10, the observers block 132' is configured to observe associations into the entity memories 112, the feedback memories 114, the document memories 116 and/or the community memories 118 from the source data 122. Detailed operations will be described below. The queries block 134' is configured to imagine associations of entities, documents, users and/or tasks from the entity memories 112, feedback memories 114, document memories 116 and/or community memories 118, in response to user queries that are provided by the user-task data 124. Detailed operations will be described below.

As also shown in FIG. 10, the processing block 130' may include a process controller block 135, also referred to simply as a "controller" or "controller block", that is configured to control the observers 132' and the queries 134' according to a selected itinerary 140. As will be described in more detail below, various itineraries 140 may be provided for documents, for feedback, for queries and/or for other functions, to provide an operational sequence that is implemented by the controller 135. The itineraries 140 may be prestored and/or programmatically generated.

Still referring to FIG. 10, a reader block 136 is provided that is responsive to source data 122, also referred to herein as source documents 122, and is configured to produce data therefrom. A task input block 137 also is provided that is responsive to user-task data 124, to produce data and obtain evaluations of query results for a user task.

Middleware systems, methods and/or computer program products 138 provide parsers, lookups, converters, extractors, elaborators and/or generators that are configured to convert outputs of the readers 136 and/or user-task inputs 137 into a form that can be used by the observers 132' and/or the queries 134', to observe (write into) or query (read from), the entity memories 112, the feedback memories 114, document memories 116 and/or community memories 118. Each of the elements of the middleware 138 will be described in more detail below.

A whiteboard block 139 also is provided that is configured to store intermediate results that are produced by the readers 136, inputs 137, middleware 138, observers 132' and/or queries 134', such that the results of one block are available for access by another block. A result display system, method and/or computer program product 126 also is provided to configure the results of a query for display.

Figure 11:
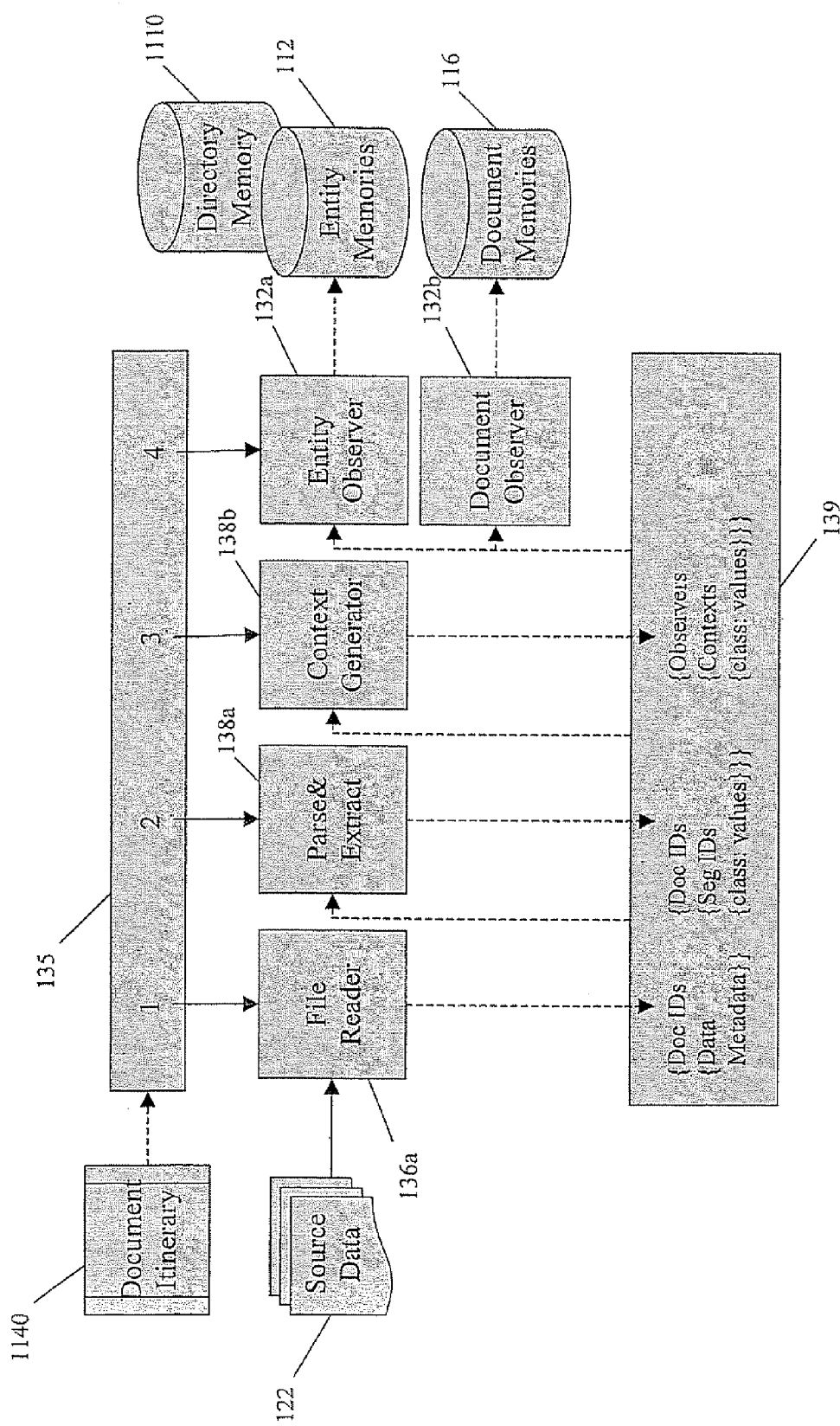
FIG. 11 is a block diagram of associative memory systems, methods and/or computer program products according to various embodiments of the present invention that are configured to observe entity memories and document memories using source data according to some embodiments of the present invention.

FIG. 11 is a block diagram of associative memory systems, methods and/or computer program products according to embodiments of the present invention that are configured to observe the entity memories 112 and the document memories 116 using source data 122, according to some embodiments of the invention. As shown in FIG. 11, the controller 135 is configured to process a document itinerary 1140, to cause the source data 122 to be observed into the entity memories 112 and document memories 116.

More specifically, referring to FIG. 11, the reader 136 of FIG. 10 is configured to operate as a file reader 136a and read the source data 122. As shown on the whiteboard 139, for each document that is read, the file reader 136a produces a document ID, the data in the document and any metadata concerning the document. The document ID can be a randomly and/or sequentially selected identification number for the document and the data can correspond to the datastream that is found in the document. Metadata can provide data about the datastream, such as a timestamp, an author or other data about the document. The file reader 136a places the document IDs along with the accompanying data and metadata on the whiteboard 139.

Still referring to FIG. 11, middleware 138 of FIG. 10 may be configured to provide parse and extract middleware 138a, which is configured to use the document ID and the data and metadata to extract segment IDs for the document, and to extract classes and values, for example according to the taxonomy that was shown in FIG. 3. The classes:values set may include attributes or entities (persons, places or things) that are extracted from the data for the given document ID. It will be understood that segments may correspond to paragraphs, sentences or other portions of documents. Moreover, in some embodiments, segments need not be used, and class:values may be extracted for an entire document as a whole. In embodiments of FIG. 11, for each segment of a source document 122, the relevant attributes and entities are extracted. The segment ID and the associated class:value sets are stored in the whiteboard 139. The metadata may provide data attributes. Other data attributes may include verbs or other non-entities that are extracted from the documents.

Still referring to FIG. 11, the middleware 138 may also be configured to provide a context generator 138b that uses the segment ID and class:value sets that were extracted to generate a context. A context that is generated by a context generator refers to a set of one or more observed attributes, entities and/or resources relative to an observer entity and/or resource. Thus, the context generator 138b provides a set of class:values that are associated with a respective observer entity or document in a given segment of a given document. The set of observers and their contexts are placed on the whiteboard 139.

Still referring to FIG. 11, the contexts that are generated by the context generator 138b are then ready to be processed by two observers. Specifically, the observer 132' of FIG. 10 may be configured to provide an entity observer 132a and a document observer 132b. The entity observer 132a is configured to observe the various observers and contexts into the entity memories 112, and the document observer 132b is configured to observe the various observers and contexts into the document memories 116. Details will be described below in connection with FIGS. 13-16.

Figure 12:
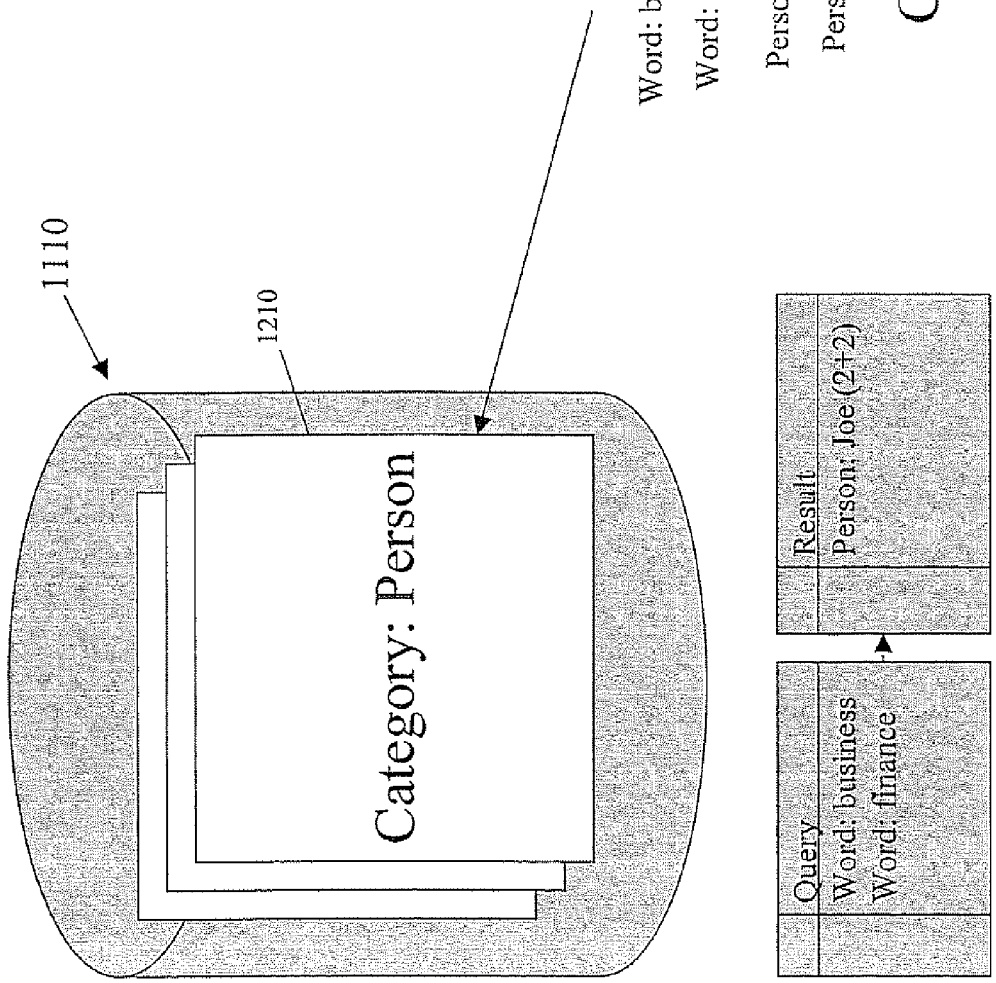
FIG. 12 illustrates an example architecture of a network of directory associative memory networks according to various embodiments of the present invention.

In some embodiments of the invention, the entity observer 132a may also observe into a directory memory 1110. A configuration of a directory memory 1110 according to some embodiments of the present invention is shown in FIG. 12. As shown in FIG. 12, the directory memory 1110 may include a network of directory associative memory networks 1210 that can provide associations among observer entities and non-entity attributes. Thus, in the example shown in FIG. 12, the attributes Word: business and Word: finance, which are not persons, places or things, may, nonetheless, be observed relative to the Observer: person. Queries, therefore, may be performed on attributes that are not entities. In other embodiments of the present invention, the directory memory 1110 may be merged with the entity memories 112 in whole or in part, or may not be provided. In yet other embodiments, the directory memory 1110 may also index entities to find them by association to keywords. The use of the directory memory 1110 can facilitate keyword searching, where a keyword does not match any entity but may be a synonym for, or relate to, one or more entities.

Figure 13:
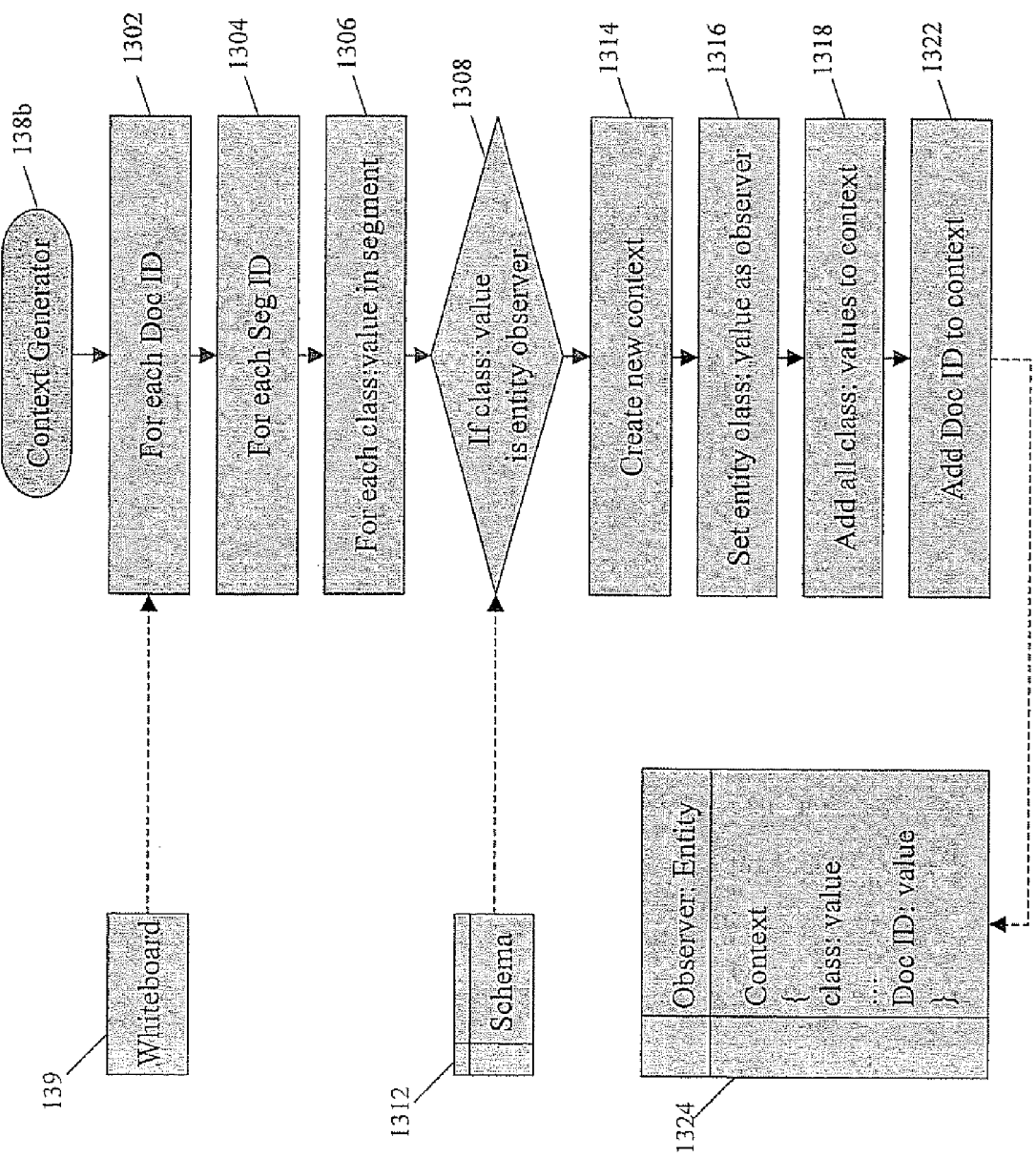
FIGS. 13-16 are flowcharts of operations that may be performed by various blocks of FIG. 12.

FIG. 13 is a flowchart of operations that may be performed by a context generator, such as a context generator 138b of FIG. 11, to generate contexts for entities that are extracted from documents by the parse and extract block 138a of FIG. 11. As shown in FIG. 13, the sets of various observers and contexts are read from the whiteboard 139. At Block 1302, for each document ID, and at Block 1304, for each segment ID, and at Block 1306, for each class:value in the segment, a determination is made at Block 1308 if the class:value is already an entity observer. This determination may be made by consulting a schema 1312 for the associative memory system, method and/or computer program product to determine whether the particular class:value is an entity observer.

If the class:value is an entity observer at Block 1308, then a new context is created at Block 1314 and, in this new context, the entity class:value is set as the observer at Block 1316. All of the referenced class:values for this document ID and this segment ID are then added as values to the context. A document ID is added to the context at Block 1322, so that the final context shown at Block 1324 is based on a specific entity being the observer, a set of classes and values that are observed by the specific entity, and a document ID that references this context. Note that a segment ID need not be provided in these embodiments because the document memories 116 can observe the documents by segment. The new context 1324 that is created is then placed on the whiteboard 139 for use by the entity observer 132a of FIG. 11, as will be described below in connection with FIG. 15.

Figure 14:
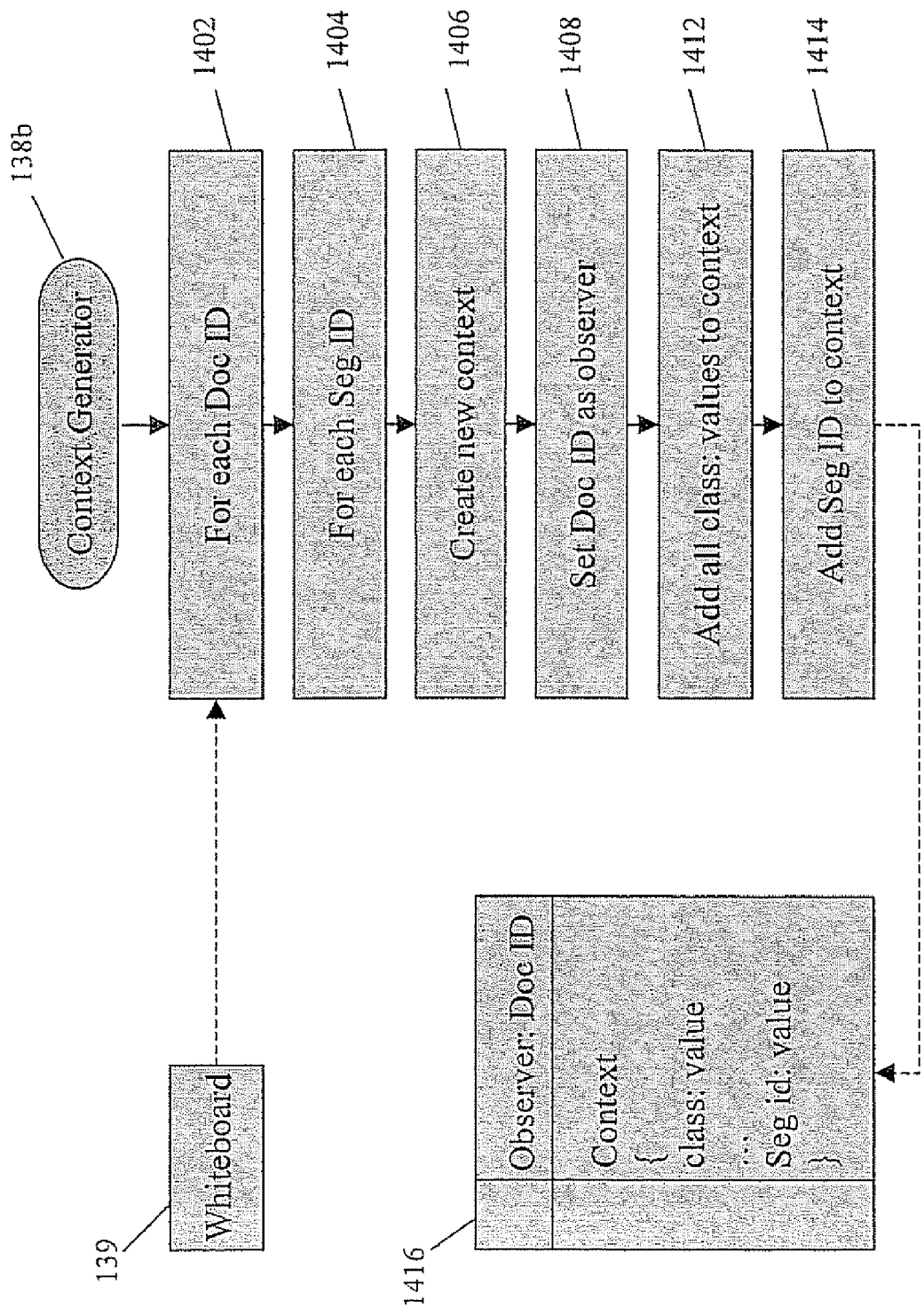

FIG. 14 is a flowchart of operations that may be performed by a context generator, such as the context generator 138b of FIG. 11, to generate contexts for documents, which are then used to observe context into the document memories 116, according to various embodiments of the present invention. As shown in FIG. 14, the context generator 138b obtains the document IDs, segment IDs and class:value sets that were placed on the whiteboard 139 by the parse and extract block 138a. Then, for each document ID at Mock 1402, and for each segment ID at Block 1404, a new context is created at Block 1406. The document ID is set as the observer at Block 1408, and then all of the class:values are added as observed attributes, entities or resources in the context at Block 1412. A segment ID is also added at Block 1414. Thus, as shown in FIG. 14, the context 1416 for an observer document includes a document ID as an observer, the observed series of class:value sets and the observed segment ID. This context may then be observed into the document memories 116 by the document observer 132b, as will be described in connection with FIG. 16.

Figure 15:
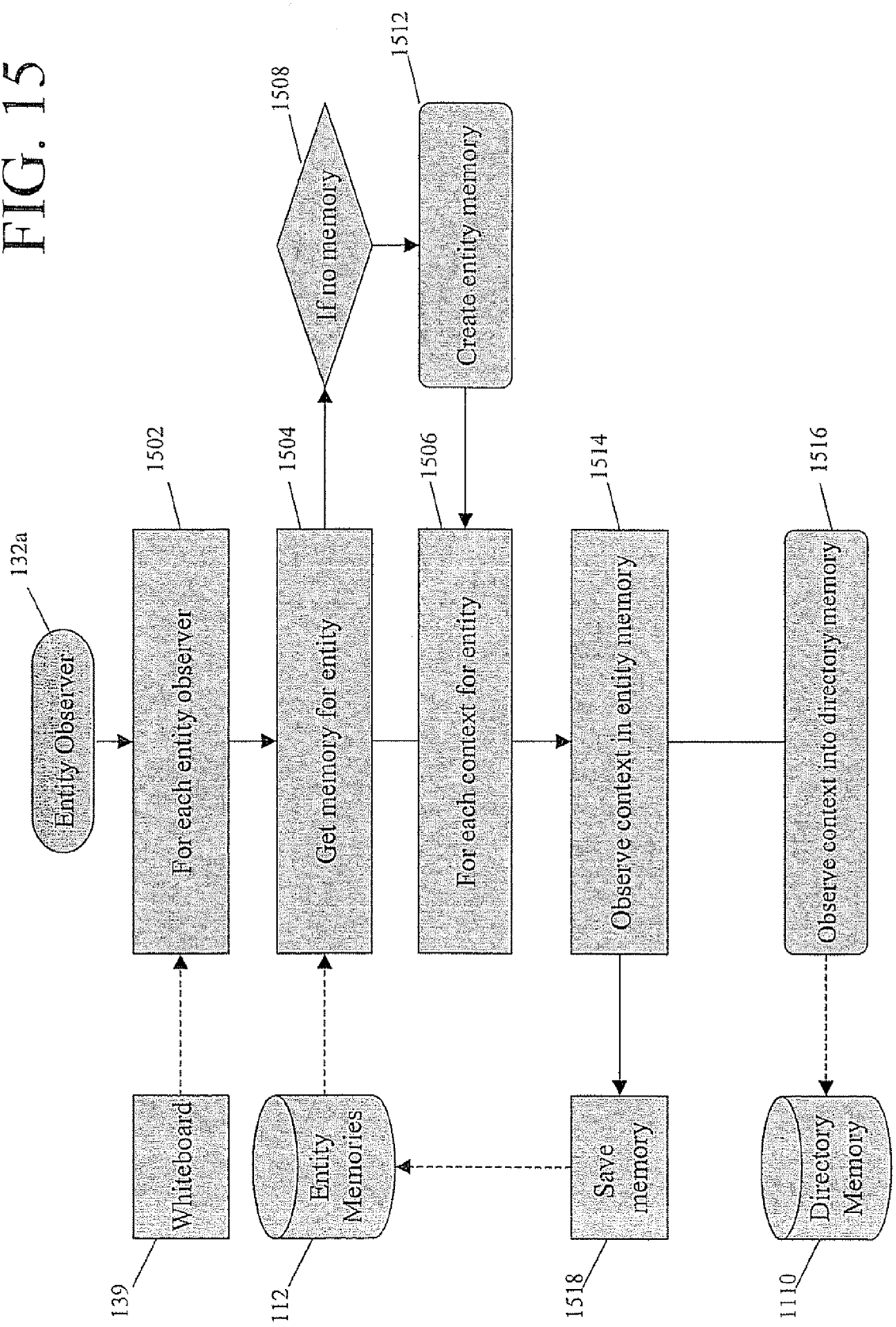

FIG. 15 is a flowchart of operations that may be performed by an entity observer, such as the entity observer 132a of FIG. 11, according to various embodiments of the present invention. As shown in FIG. 15, the contexts 1324 that were created by the context generator 138b during the operations of FIG. 13 are retrieved from the whiteboard 139. At Block 1502, for each observer:entity that creates a context 1324, the entity associative memory network 113 for that entity is obtained at Block 1504 from the entity memories 112. If there is no memory at Block 1508, then a new associative memory network 113 is created at Block 1512. Then, at Block 1506, for each context for the entity, the context is observed in the entity memory 113 at Block 1514 and saved at Block 1518 into the entity memories 112. The context also may be observed into the directory memory 1110 at Block 1516, if appropriate for that context.

Figure 16:
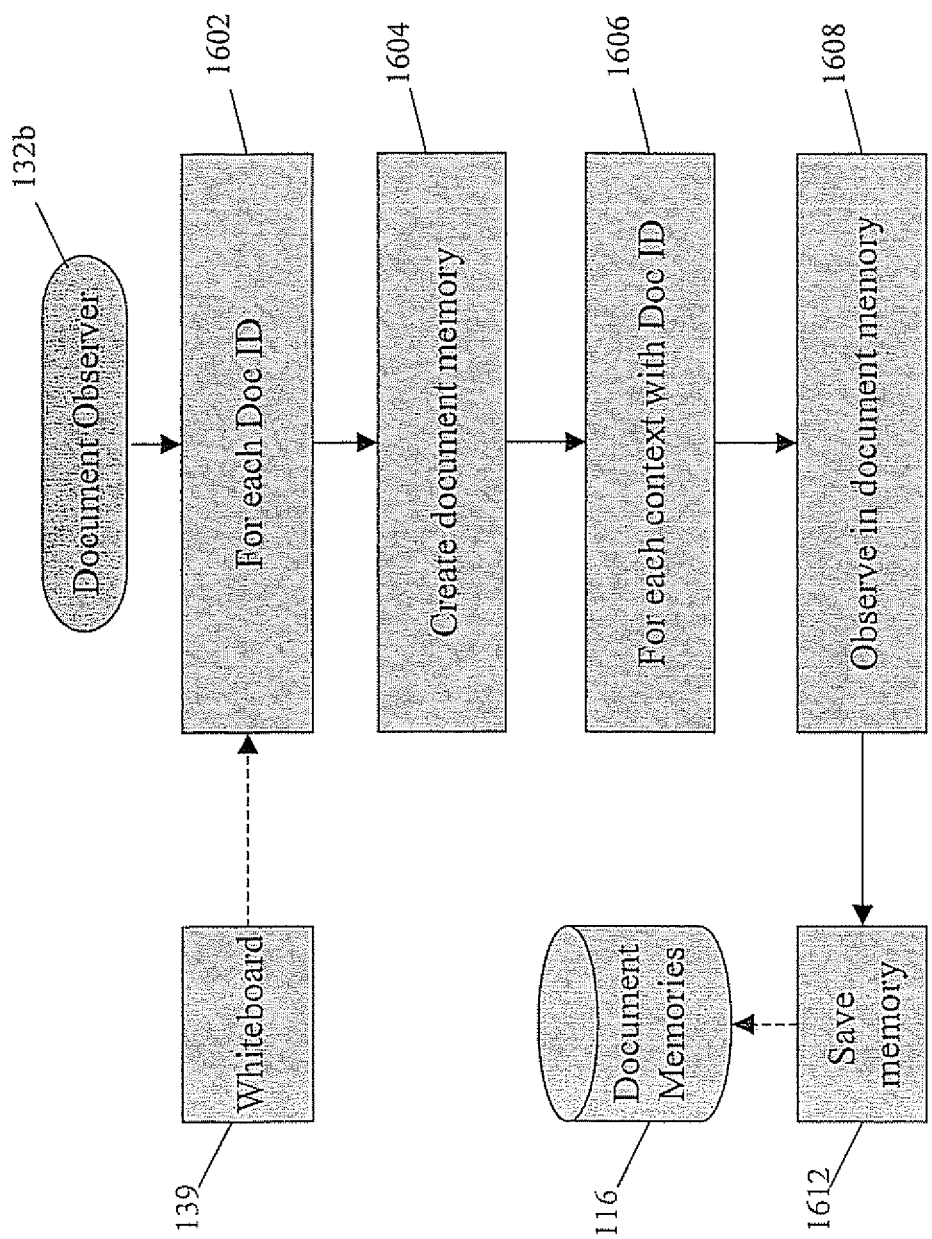

FIG. 16 is a flowchart of operations that may be performed by a document observer, such as a document observer 132b of FIG. 11. The contexts 1416 that are generated by the context generator 1386 for documents in FIG. 14 are obtained from the whiteboard 139. At Block 1602, for each document ID, a document memory 117 is created at Block 1604. Then, at Block 1606, for each context with a document ID, the context is observed into the document memory 117 and the memory is saved at Block 1612 into the document memories 116. Thus, the document memories 116 are observed.

Figure 17:
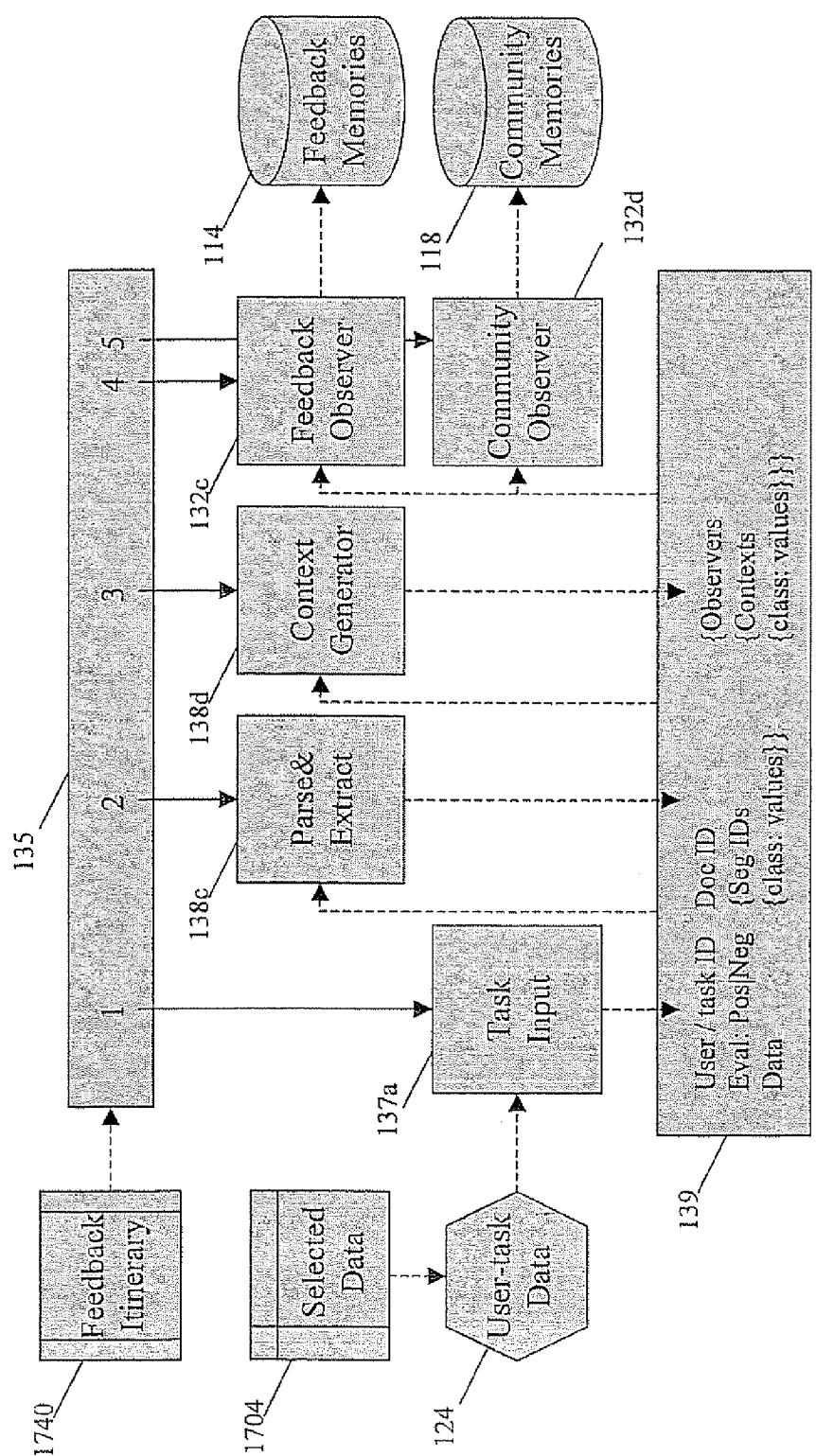
FIG. 17 is a block diagram of associative memory systems, methods and/or computer program products according to various embodiments of the present invention that are configured to observe feedback memories and community memories according to various embodiments of the present invention.

FIG. 17 is a block diagram of associative memory systems, methods and/or computer program products according to embodiments of the present invention that are configured to observe the feedback memories 114 and the community memories 118. As shown in FIG. 17, the feedback memories 114 and the community memories 118 are observed based on user-task data 124 that define a given user and/or a given task of a given user, and selected data 1704 that has been flagged by the user during the task with positive or negative feedback.

As shown in FIG. 17, the input block 137 may be configured as a task input block 137a that is responsive to the user-task data block 124 and the selected data 1704, to generate a user/task ID, a positive/negative evaluation and the associated data, and to place this information on the whiteboard 139. The middleware 138 may be configured to provide a parse and extract block 138c that is used to identify the document IDs, segment IDs and class: value sets that were contained in the data that was output by the task input block 137a, and to place the results on the whiteboard 139. The middleware 138 also may be configured to provide a context generator block 138d that generates a context including an observer context and class: values, and to place them on the whiteboard 139. The observer block 132' may be configured to provide a feedback observer 132c that acts upon the contexts generated by the context generator 138d, to observe into the feedback memories 114. The observer block 132' also may be configured to provide a community observer block 132d that is responsive to the context generated by the context generator 138d, to observe the community memories 118. Detailed operations of the context generator 138d, and of the feedback observer 132c and the community observer 132d will now be described in connection with FIGS. 18-21.

Figure 18:
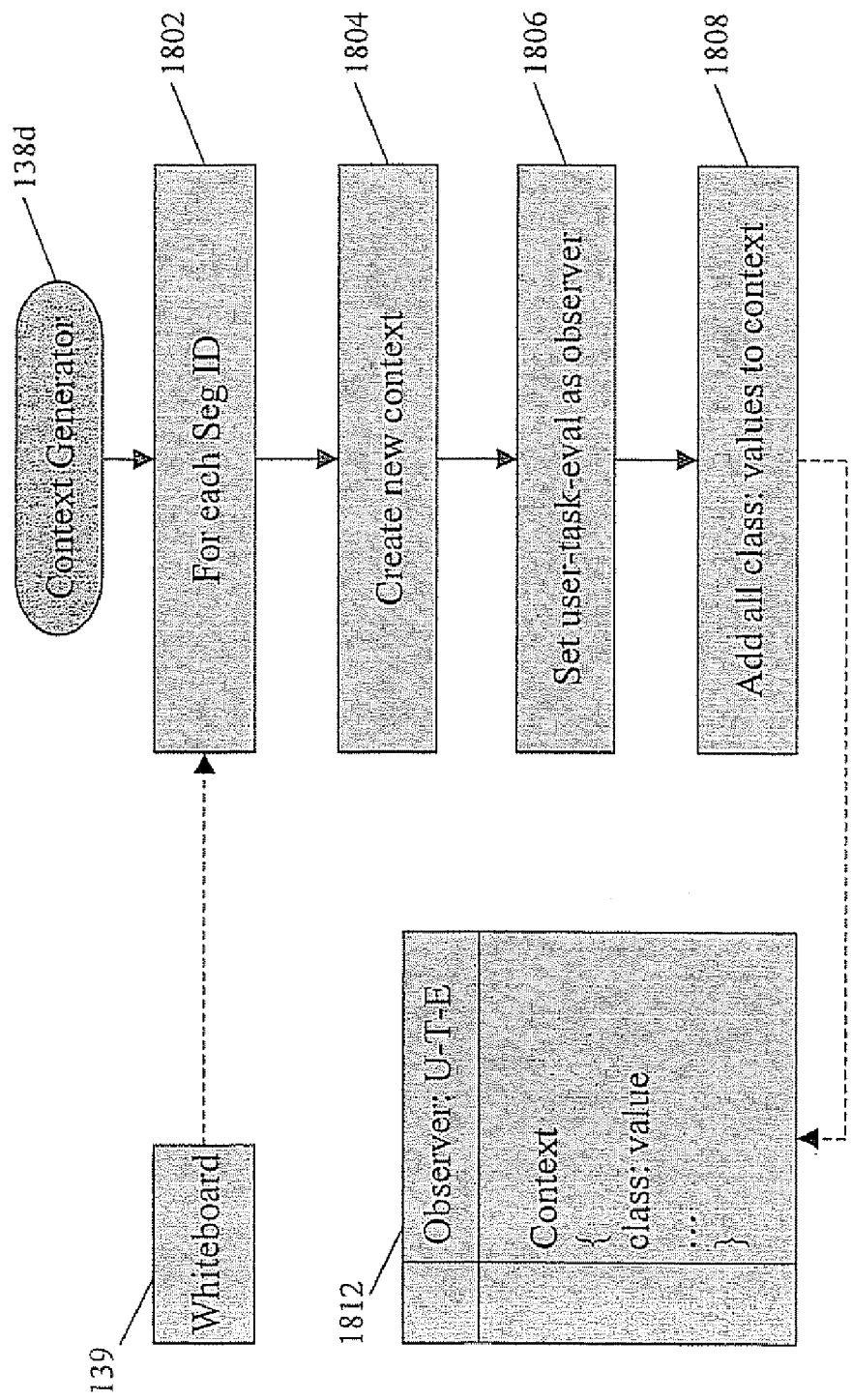
FIGS. 18-21 are flowcharts of operations that may be performed by various blocks of FIG. 17.

Referring now to FIG. 18, operations to generate context from user-task feedback data, which may be generated by the context generator 138d of FIG. 17 according to various embodiments of the invention, now will be described. As shown in FIG. 18, the data that is placed by the parse and extract block 138c on the whiteboard 139 is extracted at Block 1802 for each segment ID. A new context is created at Block 1804, wherein the user-task and a particular evaluation (positive or negative) is set as the observer at Block 1806. All of the class:values that were generated by the parse and extract block 138c and placed on the whiteboard 139 are then added to the context at Block 1808, so that the context 1812 that is generated by the context generator 138d for user feedback includes an observer of a specific user, a specific user task and a specific evaluation (U-T-E), and also includes the set of class:values for the specific user, task and evaluation. This context 1812 is then placed on the whiteboard. The feedback observer 132c is then used to observe the feedback memories 114, as will be described in connection with FIG. 20.

Figure 19:
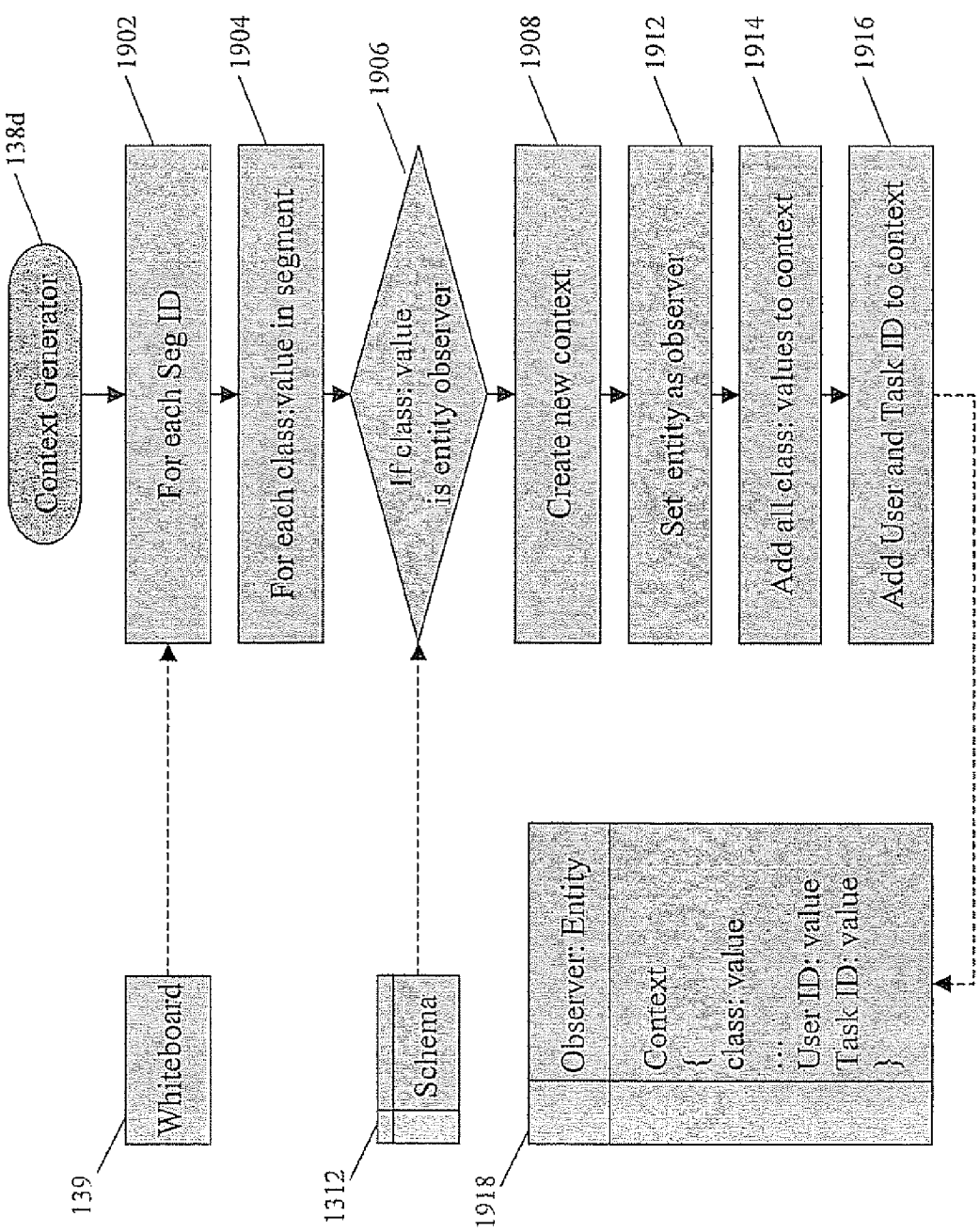

FIG. 19 is a flowchart of operations that may be performed by a context generator, such as a context generator 138d of FIG. 17, to operate on data that was provided by the parse and extract block 138c, to generate contexts that may be used to populate the community memories 118. As shown in FIG. 19, the data that is created by the parse and extract block 138c is fetched from the whiteboard 139. For each segment ID, at Block 1902, and for each class:value in the segment at Block 1904, a determination is made at Block 1906, based on the schema 1312, whether the class:value is an entity observer. If so, then a new context is created at Block 1908, and the entity is set as an observer at Block 1912. All class:values are then added to the context at Block 1914, and the user and task ID is added to the context at Block 1916, to create the context 1918 for each observer. As shown in FIG. 19, the context 1918 includes the set of class:values including user IDs and task IDs for an observer entity. One of the class and values is the positive or negative evaluation. The context 1918 is then saved on the whiteboard 139.

Figure 20:
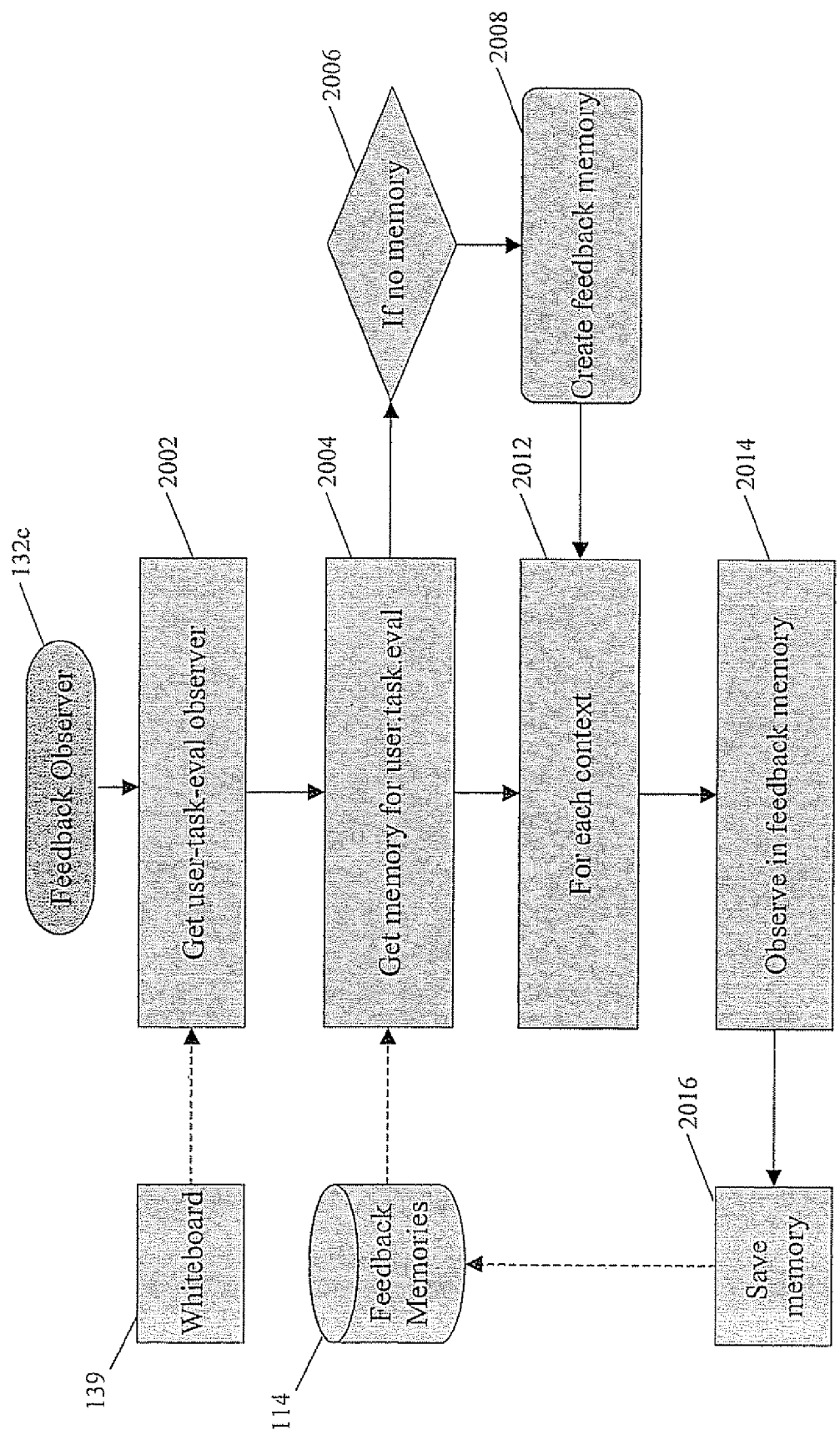

FIG. 20 is a flowchart of operations that may be performed by a feedback observer, such as a feedback observer 132c of FIG. 17. The feedback observer obtains the context 1812 that is generated by the context generator 138d of FIG. 18 from the whiteboard 139. Thus, at Block 2002, for a given user:task: evaluation observer, the observer 1812 is obtained from the whiteboard 139. At Block 2004, the feedback memory for the given user:task:evaluation is obtained. If there is no feedback memory at Block 2006, then a feedback memory is created at Block 2008. Then, at Block 2012, for each context, the context is observed into the feedback memory and saved at Block 2016 in the feedback memories 114.

Figure 21:
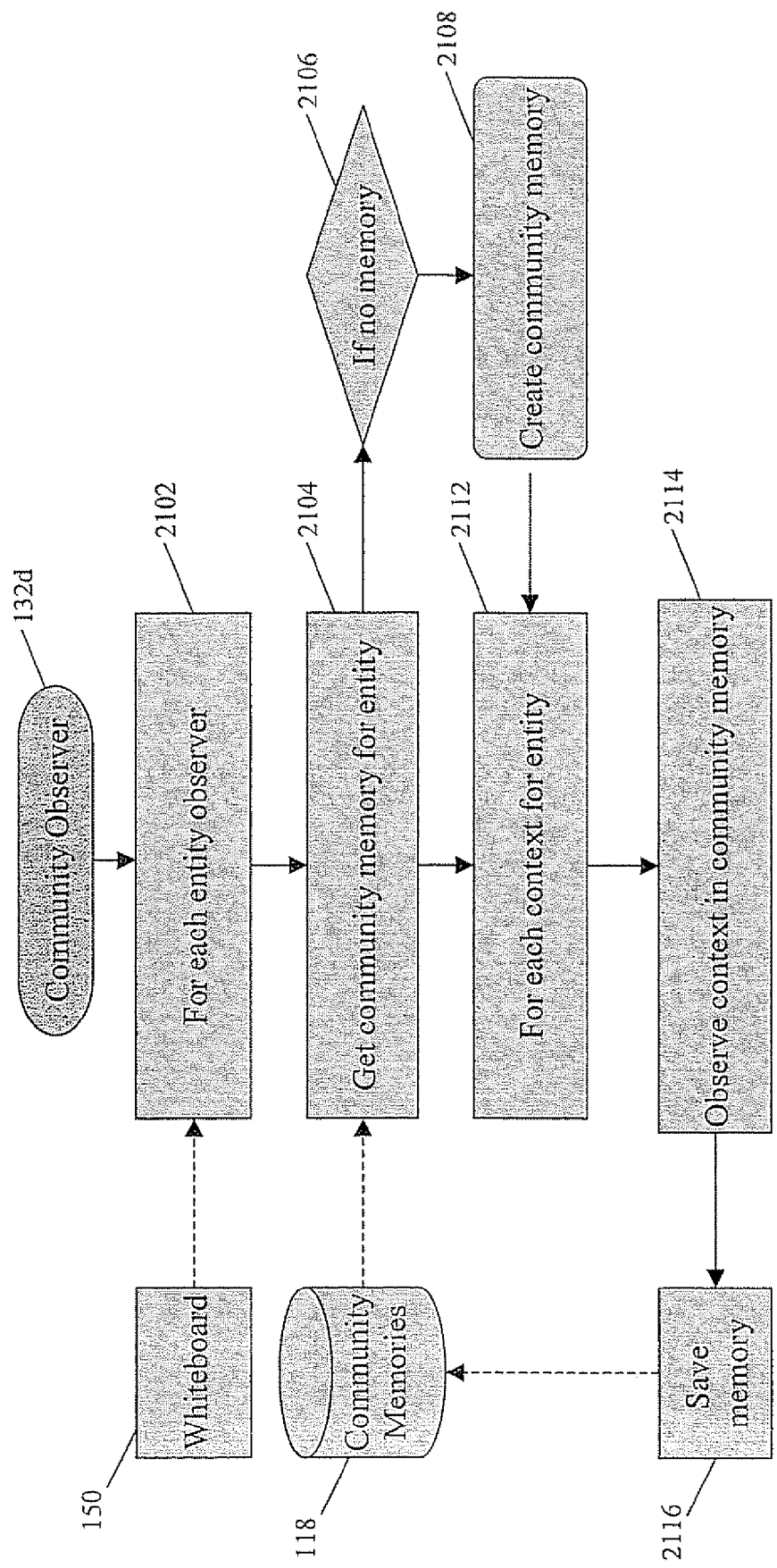

FIG. 21 is a flowchart of operations that may be performed by a community observer, such as the community observer 132d of FIG. 17. At Block 2102, for each entity observer 1918 that was placed on the whiteboard 139 by the context generator 138d as a result of operations of FIG. 19, the community memory 119 in the community memories 118 for the entity is obtained at Block 2104. If there is no community memory at Block 2106, a new community memory 119 is created at Block 2108. Then, at Block 2114, for each context for the entity, the context is observed into the community memories 119 and saved at Block 2116 into the community memories 118.

Figure 22:
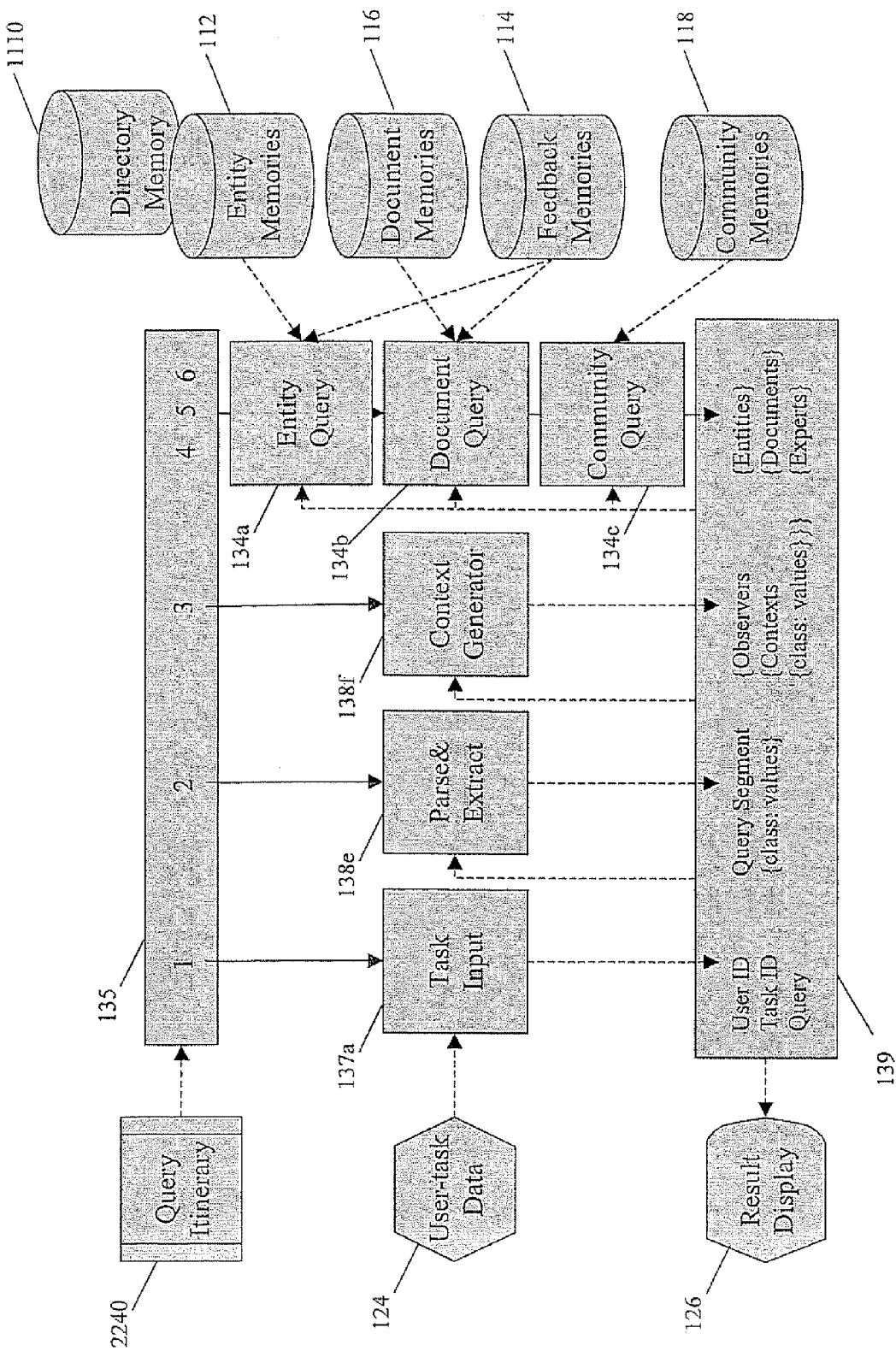
FIG. 22 is a block diagram of systems, methods and/or computer program products that can process a query according to various embodiments of the present invention.

FIG. 22 is a block diagram of systems, methods and/or computer program products according to embodiments of the present invention, that may be used to process a query. As shown in FIG. 13, the controller 135 operates to process a query itinerary 2240. User-task data 124 is accepted by a task input block 137a and a user ID, task ID and query data is generated from the user-task data, and placed on the whiteboard 139. Entities that are contained in the query data also may be generated from the user-task data. A parse and extract block 138e extracts query segment and class:value sets belonging to the query, and places them on the whiteboard 139. A context generator 138f then generates the observers for the query including contexts having class:values, and places them on the whiteboard 139. An entity query block 134a uses the contexts to query the entity memories 112 and the feedback memories 114. A document query block 134b queries the document memories 116 and the feedback memories 114. A community query block 134c queries the community memories 108. The entity query 134a, document query 134b and community query 134c blocks generate a list of entities, documents and experts (users), and place these results on the whiteboard 139 for display by the result display block 126.

Figure 23:
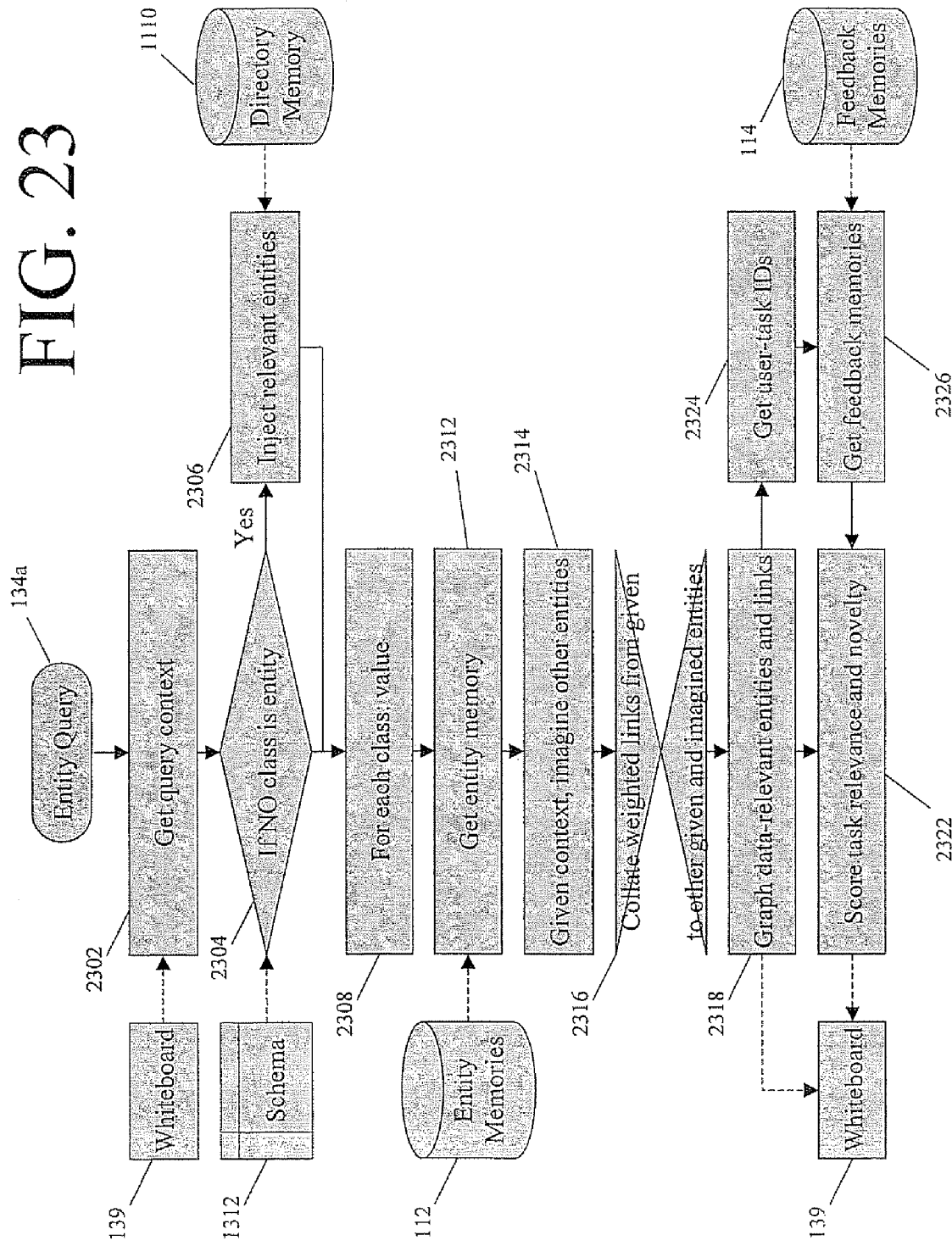
FIGS. 23-28 are flowcharts of operations that may be performed by various blocks of FIG. 22 according to various embodiments of the present invention.

FIG. 23 is a flowchart of operations that may be performed by an entity query block, such as the entity query block 134a of FIG. 22. As shown in FIG. 23, operations begin by the entity query block obtaining a query context from the whiteboard 139, at Block 2302. Then, at Block 2304, based on the database schema 1312, if no class of the query is an entity, then the relevant entities are injected from the directory memory 1110 at Block 2306. Thus, results may be obtained even if the query does not use entities that are already observed. Alternatively, at Block 2304, if there is an entity, then, at Block 2308, for each class:value, the relevant entity memory 113 is obtained from the entity memories 112 at Block 2312. At Block 2314, given the context, other entities are imagined. At Block 2316, the weighted links from a given entity to other given and imagined entities are collated, and the data-relevant entities and links are graphed at Block 2318, and placed on the whiteboard 139. Moreover, a user-task ID is obtained at Block 2324, and the associated feedback memory 115 is obtained from the feedback memories 114 at Block 2326. The data-relevant entities and links from Block 2318 and the feedback memory 115 from Block 2326 are scored for task relevance and novelty at Block 2322, and also placed on the whiteboard 139. The task relevance and novelty are scored at Block 2322, to identify new and interesting results, as will be described in detail below in connection with FIG. 26.

Figure 24:
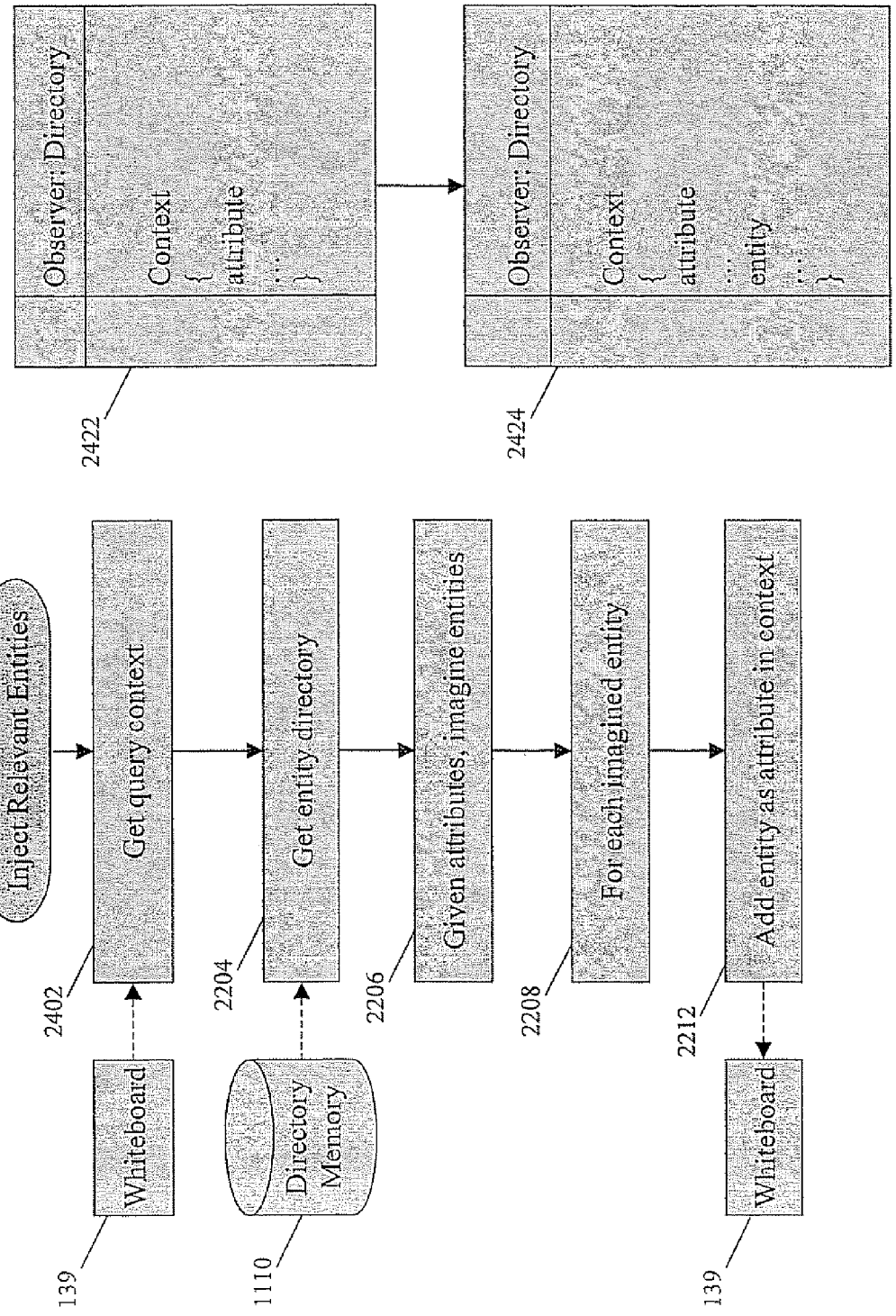

FIG. 24 is a flowchart of operations that may be performed to inject relevant entities, which may correspond to Block 2306 of FIG. 23, according to various embodiments of the present invention. As shown in FIG. 24, the query context is obtained from the whiteboard 139 at Block 2402. The relevant observer:directory context 2422 is obtained from the directory memory 1110 at Block 2204. At Block 2206, given the attributes, the entities are imagined. At Block 2208, for each imagined entity, the entity is added as an attribute in the observer:directory context 2424 at Block 2212 and the context is stored in on the whiteboard 139.

Figure 25:
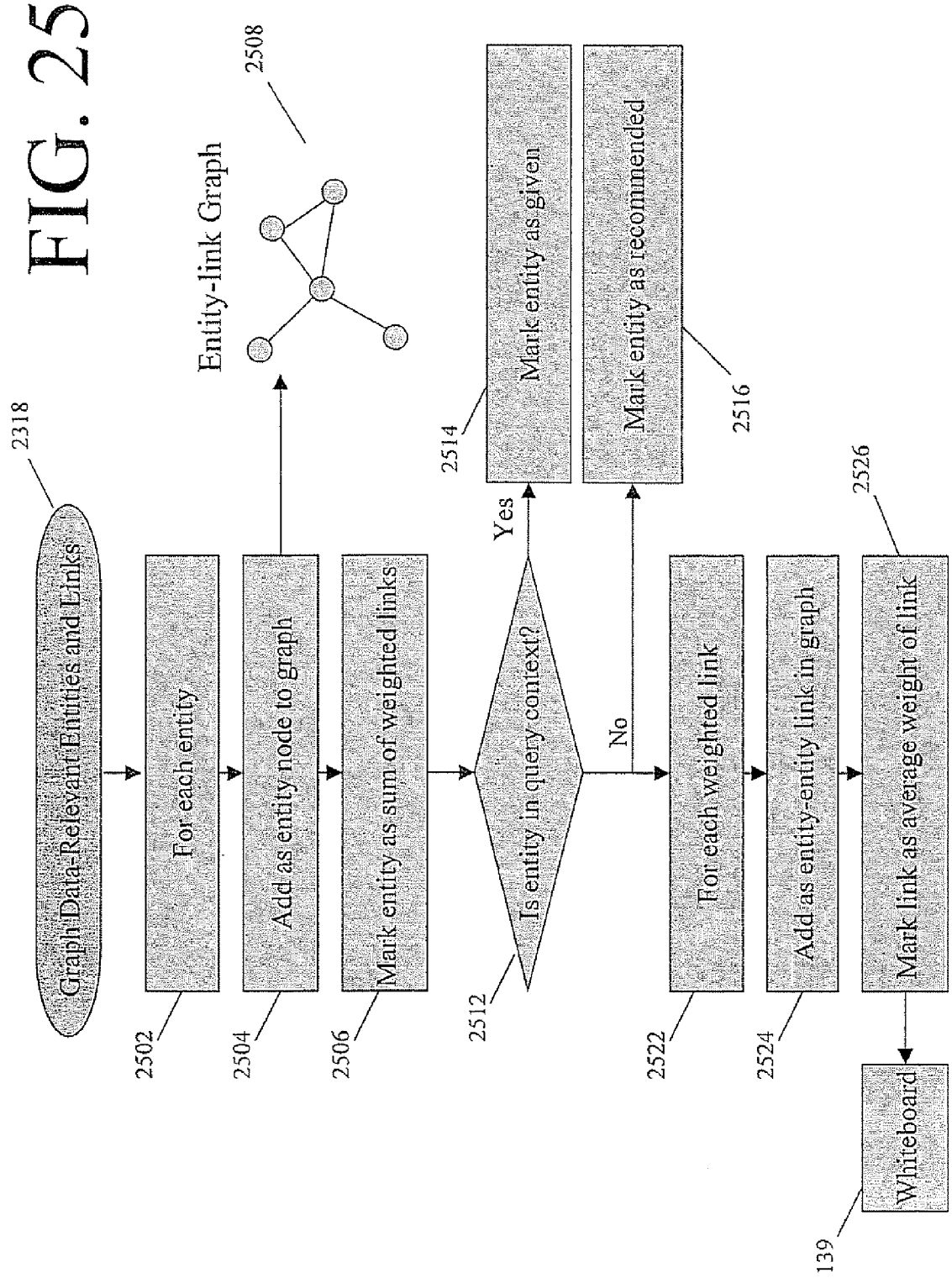

FIG. 25 is a block diagram of operations to graph data-relevant entities and links, for example as was described in Block 2318 of FIG. 23. As shown in FIG. 25 at Block 2502, for each entity, an entity node is added to an entity-link graph 2508 at Block 2504. At Block 2506, the entity is marked as a sum of weighted links. At Block 2512, a determination is made as to whether the entity is in the query context. If yes, then at Block 2514, the entity is marked as given. If no, then at Block 2516, the entity is marked as recommended. At Block 2522, for each weighted link, an entity-entity link is added to the graph at Block 2524 and the link is marked as an average weight of the link at Block 2526 and placed in the whiteboard 139.

Figure 26:
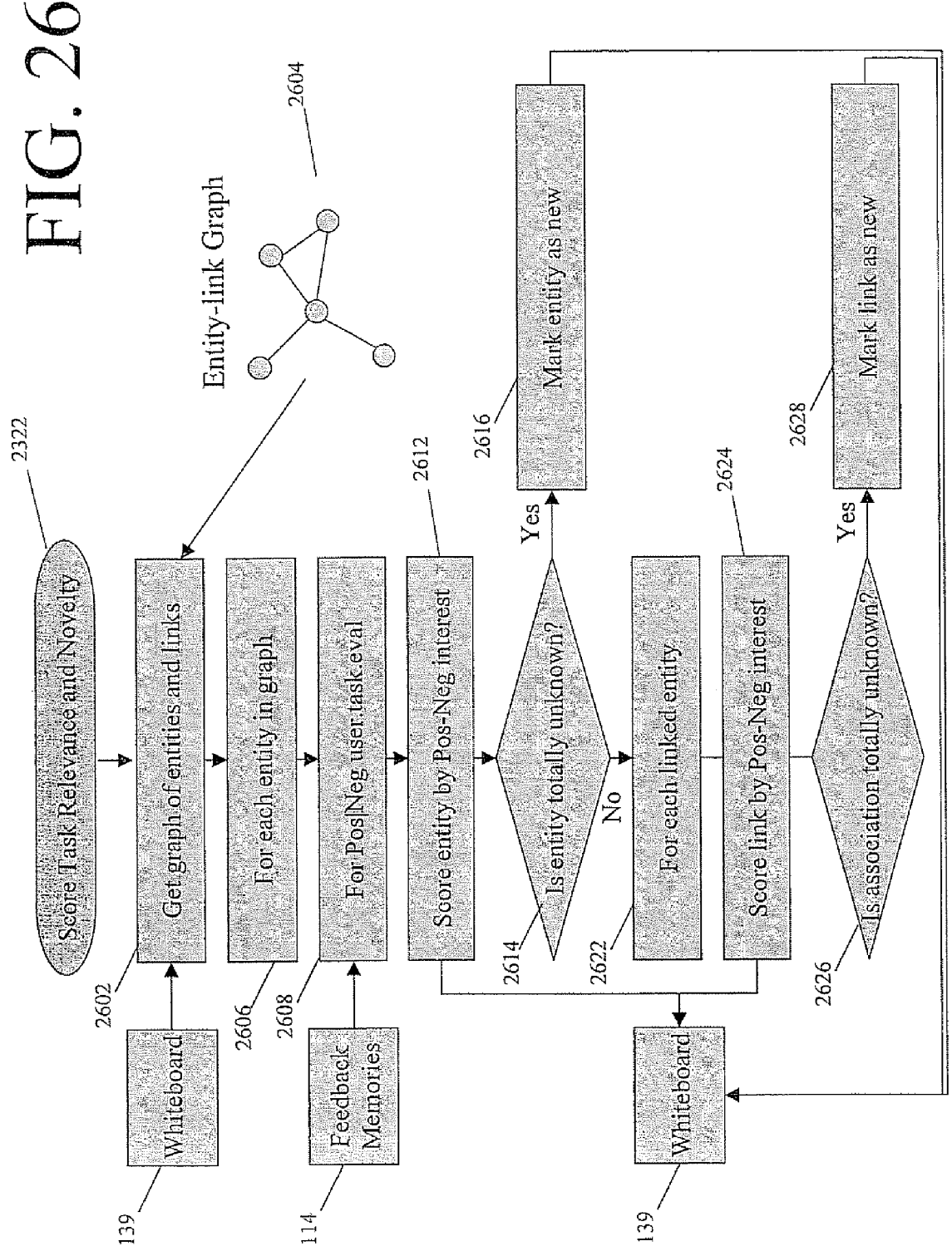

FIG. 26 is a flowchart of operations that may be performed to score task relevance and novelty, which may correspond to Block 2322 of FIG. 23. As shown in FIG. 26, a graph of entities and links 2604 is obtained at Block 2602, which may correspond to Block 2318 and FIG. 23. At Block 2606, for each entity in the graph, and at Block 2608, for the positive and negative user task evaluations, the attribute is scored at Block 2612 by its positive and negative interest. Scoring may take place by performing a sum of the links that link to entities and/or based on other conventional techniques such as entropy and/or probability. If the entity is totally unknown at Block 2614, then the entity is marked as new at Block 2616, and placed on the whiteboard 139. If the entity is not totally unknown at Block 2614, then at Block 2622, for each linked entity, a score is obtained at Block 2624 by positive and negative interest. In some embodiments, separate scores may be maintained for positive and negative interest (feedback). In other embodiments, a score may be determined based on positive minus negative interest. If the association is totally unknown at Block 2626, then the link is marked as new at Block 2628 and put on the whiteboard. Accordingly, FIG. 26 allows the associative memory to determine what is new (novel) and what is interesting (relevant to the task) for a given user who is performing a given task.

Figure 27:
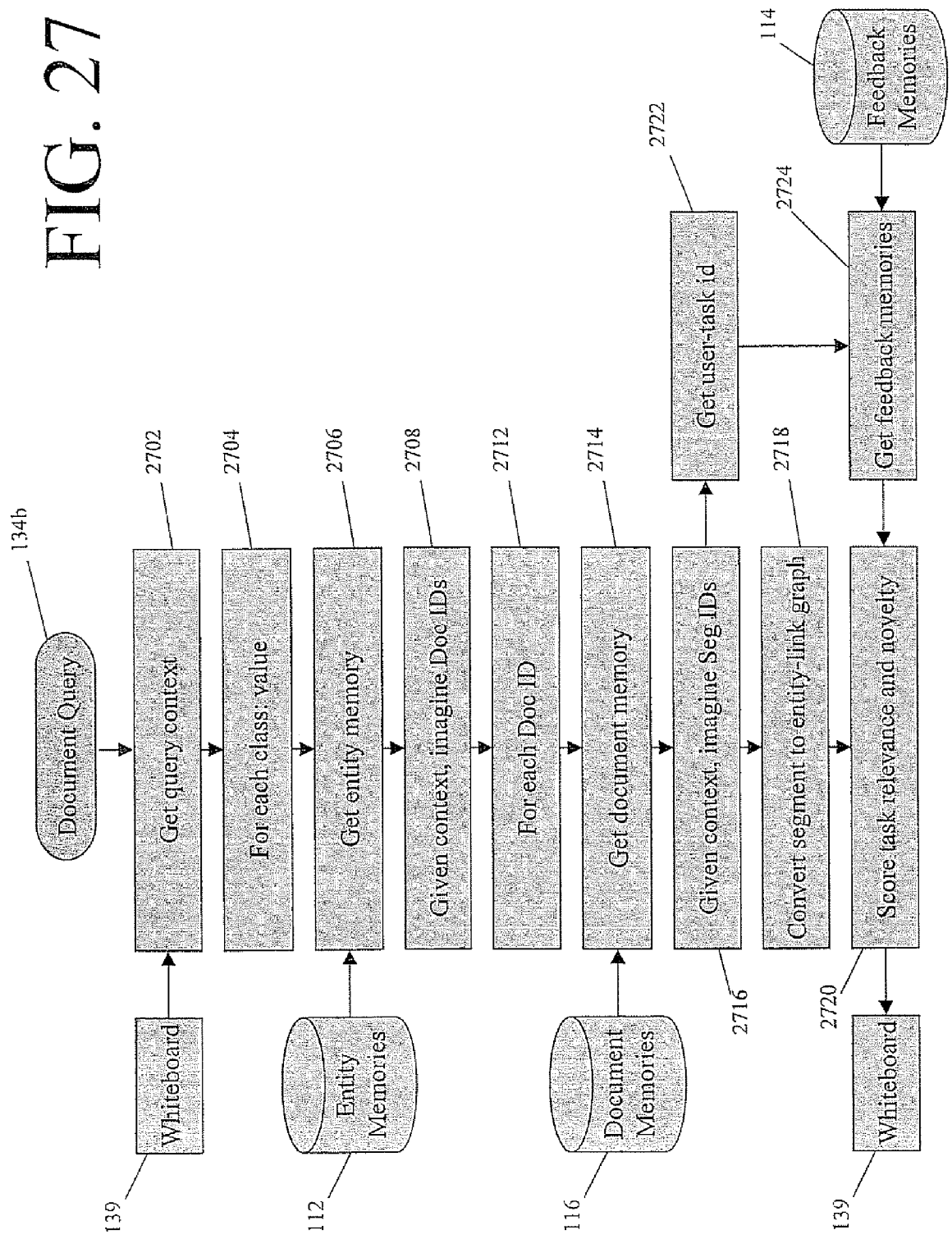

FIG. 27 is a flowchart of operations that may be performed by a document query block, such as a document query block 134b of FIG. 22. As shown in FIG. 27, a query context is obtained from the whiteboard 139 at Block 2702. At Block 2704, for each class:value, the relevant entity memory 113 is obtained from the entity memories 112 at Block 2706. At Block 2708, given the context, the document IDs are imagined, and then at Block 2712, for each document ID, the document memory 117 is obtained from the document memories 116 at Block 2714. Given the context, the segment IDs are imagined at Block 2716, and a graph is generated from the segments at Block 2718. Moreover, when imagining segment IDs at Block 2716, the user-task ID also is obtained at Block 2722 and the relevant feedback memory 115 is obtained from the feedback memories 114 at Block 2724. Task relevance and novelty are then scored at Block 2720, and the results are placed on the whiteboard 139.

Figure 28:
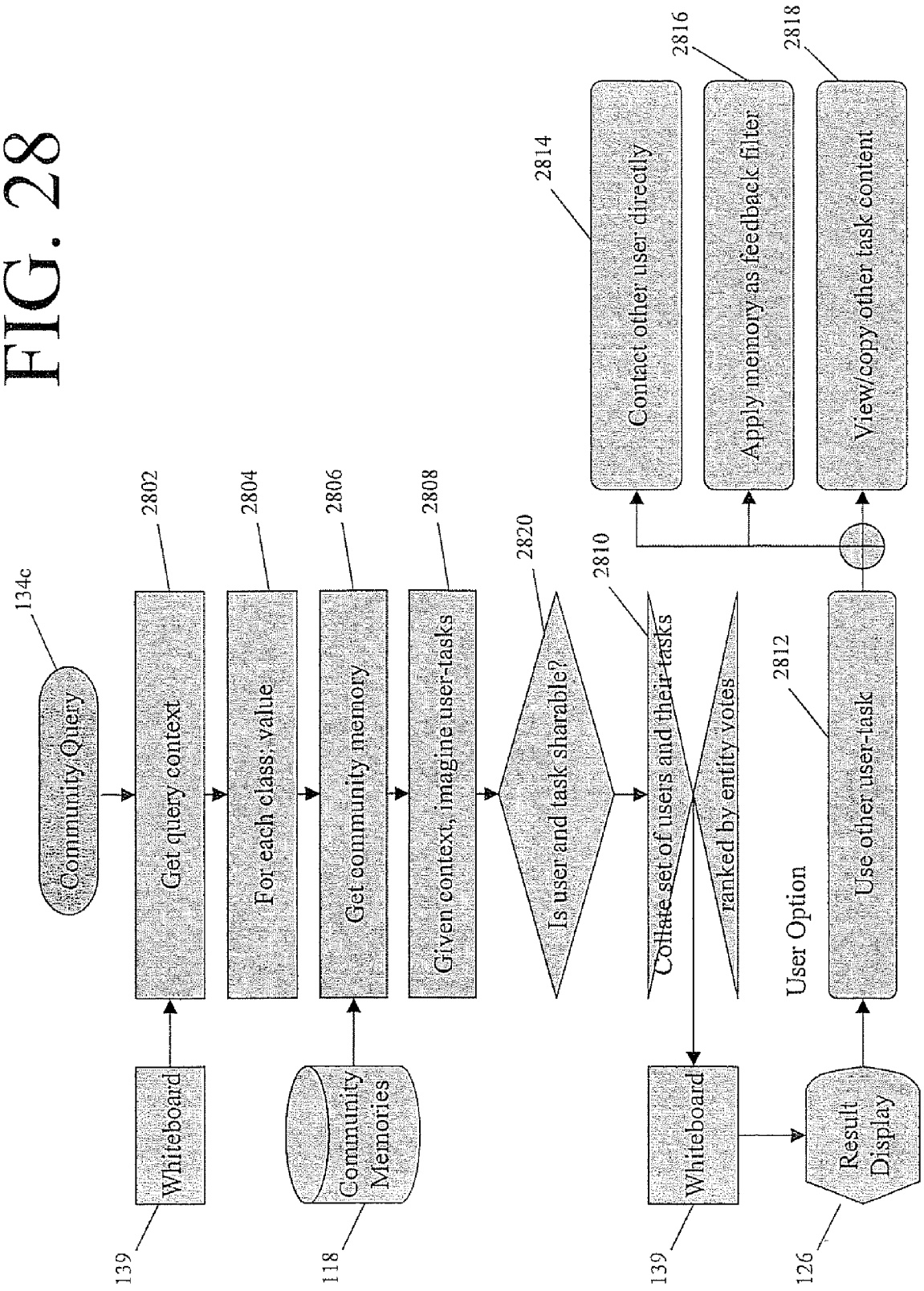

FIG. 28 is a flowchart of operations that may be performed by a community query block, such as the community query block 134c of FIG. 22. As shown in FIG. 28, at Block 2802, a query context is obtained from the whiteboard 139. At Block 2804, for each class:value, the relevant community memory 119 is obtained from the community memories 118 at Block 2806. At Block 2808, given the context, user tasks are imagined. If the user and task are flagged as being sharable (Block 2820), a set of users and their tasks, ranked by entity votes, is collated at Block 2810 and placed on the whiteboard 139, for display on the result display 126. A user option may be presented at Block 2812 as to whether the other user-task should be used. In response to the set of users and their tasks that was generated at Block 2810, the user may contact the other user directly at Block 2814, may apply the other user memory as a feedback filter at Block 2816 and/or may view/copy the other task content in a read-only mode at Block 2818.

Additional discussion of various embodiments of the invention now will be provided. In particular, traditional data management solutions have been focused on the acquisition and storage of massive amounts of data within an organization. However, the difficulty of analysts (users) to effectively mine this data may create a significant impediment to the accurate and timely completion of their tasks. As a consequence, analysts may be forced to spend much of their valuable time searching data sources of interest and may be left with very little time to analyze the important knowledge contained within the data.

Enterprise data is often stored in relational databases that may excel at the storage of large amounts of data, but the extraction of knowledge through the use of structured queries is often inefficient and even ineffective. Analysts may have difficulty forming intelligent and relevant queries without thorough study of, and familiarization with, the content and schema designed to warehouse the data.

Even the most capable search technologies available may not solve these potential problems. Keyword searching may be limited to the corpus of data that has been indexed and tagged, and the tools may have no recollection of what certain keywords mean to specific analysts from one session to the next. Data-mining techniques are evolving into more productive entity modeling approaches that output concept maps and network graphs. However, concept maps and link modeling tools may fall into two categories: those that attempt to model every data source automatically, which may present a tangled mess for interpretation, and those that require links to be authored manually, which may consume valuable analysis time. Additionally, these techniques may not be capable of effectively highlighting new and interesting information for analysis.

Once an analyst manages to properly structure a query or keyword set to retrieve a usable set of data, the work of interpreting the data to decipher its meaning and task relevance generally is performed. Typically, only then can the analyst progress to the critical function of analyzing the meaning and importance of the knowledge contained within the data set.

In order to overcome these potential problems and to allow analysts to refocus onto their analytical work, some embodiments of the invention can provide tools that can alleviate the tedious process of searching through volumes of potentially relevant data to extract a usable subset of relevant information. Further, instead of using only a data repository in their analysis, the knowledge contained within the universe of enterprise data may be transformed into a fully interactive knowledge repository that can also support knowledge capture and sharing among analysts. Analysts can read data sources that mention subjects of interest and understand what the data says. To facilitate analysis workflow, some embodiments of the invention can recognize not only the existence of subjects within data but also understand the context of each mention.

Thus, some embodiments of the present invention can provide a new form of knowledge mining tool that can promote the knowledge contained within data into a fully interactive knowledge repository. The time analysts spend retrieving relevant data can be compressed, and the time knowledge is available for analysis can be increased.

Moreover, some embodiments of the present invention can recognize the entities within data that analysts are interested in understanding. Data can be read through an automatic, real-time ingestion process and the knowledge can be stored within the data as a network of networks of associative memory networks representing the entities occurring in the totality of data available. Some embodiments of the present invention can read both structured and unstructured data and can monitor databases and text repositories for new information. The new information can be assimilated into the knowledge repository in real time. As new data is ingested, the original memory models are updated with the new information so that analysts studying entities and relationships of interest can have access to a universal perspective of the entities or can work with the entity strictly within the context that interests them.

Analysts can interact with the knowledge repository in some embodiments of the present invention, through a browser-based application. The environment can be task-oriented, by adapting to the manner that analysts work rather than having the analyst adapt to the design of the application. Tasks can be defined and stored for later use, again preserving valuable time to focus on analysis. Within a defined task, analysts can submit unstructured text queries about entities and contexts of interest. Embodiments of the present invention can receive the analyst's query and search the entity network for context-dependent associations among the entities, along with the original data that supports the associations.

Analysts may be presented with multiple views of the information to conduct analysis. An entity graph view can present a visual network of the entities of interest and even can auto complete to find a connection between entities when a connection cannot be deciphered strictly from the query. An entity graph view can allow the analyst to drill down to view all relevant associations of the entity to other entities within the knowledge repository so that new hypotheses can be formed on the fly as previously unknown associations are discovered. Links within the entity graph view can also be selected to fully explain the conditions and evidence that connects the entities displayed. Both entities and links also can be presented in table form if the analyst prefers a more traditional data presentation, such as for sorting the list.

A documents panel can be provided to return the list of the most relevant data that has been read by the knowledge repository, which supports the contextual relationships among entities. The data may be listed with a preview of the most relevant excerpts of the data with each entity highlighted for quick identification and review. This list can provide a numerical measure of the relevancy of each listed document from the perspective of the data network, the community of analysts, and the user's own personal experience. The user's score can highlight data that is very relevant to the query, but that also contains information that is new to the analyst. This is another illustration of an ability to recommend data to analysts for finding what is relevant and new according to some embodiments of the present invention. The data suggested for review by embodiments of the present invention can be viewed within the application's document viewer. The document view can link directly to the data, which can support an analyst's need to analyze relevant data first-hand.

Embodiments of the present invention can provide a highly collaborative environment and can support the modeling of individual analysts and the sharing of knowledge across a community of analysts. The models of each individual analyst can allow embodiments of the present invention to learn what the analyst already knows and what is generally interesting to the community. Community models allow analysts to publish notes which make their tacit knowledge about concepts available to other analysts. This can reduce duplication of effort, can allow for the sharing of information, and can further accelerate analysis activity.

Setup and integration of some embodiments of the present invention with existing data sources may be facilitated by an XML configuration schema and ingestion utilities that can require very little administrative support. Embodiments of the present invention can easily integrate with commercially available entity extraction tools, data readers, and translators.

Modeling of knowledge as a network of networks of associative memory networks according to some embodiments of the present invention can go far beyond traditional co-occurrence matrices in that the nature of a relationship between two or more entities can be dependent upon the context in which they occur together. Multiple, cross-document contexts for all entities may be supported because contexts in which entities appear may be perpetually stored within the entity associative memory models. This can preserve the integrity of entity models within the repository as new data is read. New contexts for a given entity may be read and understood without the loss of previously observed contexts.

Context storage within entity and user models also can add a dimension in multianalyst environments. Separate analysts may have interest in common entities from differing perspectives. The storage of contexts within entity and user models allows some embodiments of the present invention to support analysts regardless of their perspective. Beyond single, abstract links between entities, everything may be context dependent. Each analyst may be presented with recommended data, and new information most relevant to their respective interests in context.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A knowledge management system comprising:
    an associative memory system; and
    an observer system that is configured to observe associations among user queries, results of user queries and user evaluations of results of user queries for a plurality of users, into the associative memory system.

2. A knowledge management system according to claim 1 further comprising:
    a query system that is configured to imagine associations from the associations among user queries, results of user queries and user evaluations of results of user queries for a plurality of users that were observed into the associative memory system, in response to a query by a given user.

3. A knowledge management system according to claim 1 wherein the user queries are defined by a plurality of entities that are stored in the knowledge base, the results of user queries are defined by associations among the entities that are stored in the knowledge base and wherein the evaluations of results of user queries are defined by positive and/or negative evaluations of the associations among the entities.

4. A knowledge management system according to claim 2 wherein the query system is further configured to identify associations, user queries, results of user queries and/or users that are not known to a given user, in response to a query by the given user.

5. A knowledge management system according to claim 2 wherein the querying system is further configured to identify associations that were evaluated as interesting to another user, in response to a query by the given user.

6. A knowledge management method comprising:
   observing associations among user queries, results of user queries and user evaluations of results of user queries for a plurality of users, into an associative memory system.

7. A knowledge management method according to claim 6 further comprising:
   imagining associations from the associations among user queries, results of user queries and user evaluations of results of user queries for a plurality of users that were observed into the associative memory system, in response to a query by a given user.

8. A knowledge management method according to claim 6 wherein the user queries are defined by a plurality of entities that are stored in the knowledge base, the results of user queries are defined by of associations among the entities that are stored in the knowledge base and wherein the evaluations of results of user queries are defined by positive and/or negative evaluations of the associations among the entities.

9. A knowledge management method according to claim 7 further comprising:
   identifying associations, user queries, results of user queries and/or users that are not known to a given user, in response to a query by the given user.

10. A knowledge management method according to claim 7 further comprising:
    identifying associations that were evaluated as interesting to another user, in response to a query by the given user.

11. A knowledge management computer program product, the computer program product comprising a computer usable storage medium having computer-readable program code embodied in the medium, the computer-readable program code comprising:
    computer-readable program code that is configured to provide an associative memory system; and
    computer-readable program code that is configured to observe associations among user queries, results of user queries and user evaluations of results of user queries for a plurality of users, into the associative memory system.

12. A knowledge management computer program product according to claim 11 further comprising:
    computer-readable program code that is configured to imagine associations from the associations among user queries, results of user queries and user evaluations of results of user queries for a plurality of users that were observed into the associative memory system, in response to a query by a given user.

13. A knowledge management computer program product according to claim 11 wherein the user queries are defined by a plurality of entities that are stored in the knowledge base, the results of user queries are defined by associations among the entities that are stored in the knowledge base and wherein the evaluations of results of user queries are defined by positive and/or negative evaluations of the associations among the entities.

14. A knowledge management computer program product according to claim 12 further comprising:
    computer-readable program code that is configured to identify associations, user queries, results of user queries and/or users that are not known to a given user, in response to a query by the given user.

15. A knowledge management computer program product according to claim 12 further comprising:
    computer-readable program code that is configured to identify associations that were evaluated as interesting to another user in response to a query by the given user.

* * * * *